United States Patent
Bhamri et al.

(10) Patent No.: US 12,335,018 B2
(45) Date of Patent: *Jun. 17, 2025

(54) ARTIFICIAL INTELLIGENCE ENABLED BEAM MANAGEMENT

(71) Applicant: LENOVO (SINGAPORE) PTE. LTD., New Tech Park (SG)

(72) Inventors: Ankit Bhamri, Bad Nauheim (DE); Ahmed Hindy, Aurora, IL (US); Ali Ramadan Ali, Kraiburg am Inn (DE)

(73) Assignee: Lenovo (Singapore) PTE. LTD, New Tech Park (SG)

( * ) Notice: Subject to any disclaimer, the term of this patent is extended or adjusted under 35 U.S.C. 154(b) by 0 days.

This patent is subject to a terminal disclaimer.

(21) Appl. No.: 18/610,739

(22) Filed: Mar. 20, 2024

(65) Prior Publication Data

US 2024/0348321 A1 Oct. 17, 2024

Related U.S. Application Data

(63) Continuation of application No. 17/556,563, filed on Dec. 20, 2021, now Pat. No. 11,962,389.

(51) Int. Cl.
  *H04B 7/08* (2006.01)
  *H04W 24/02* (2009.01)

(52) U.S. Cl.
  CPC ......... *H04B 7/0888* (2013.01); *H04B 7/0857* (2013.01); *H04W 24/02* (2013.01)

(58) Field of Classification Search
  CPC .... H04B 7/0888; H04B 7/0857; H04W 24/02
  See application file for complete search history.

(56) References Cited

U.S. PATENT DOCUMENTS 10,505,616 B1 12/2019 Chen et al.
11,082,115 B2 8/2021 Landis et al.
(Continued)

FOREIGN PATENT DOCUMENTS

CN 114390580 A 4/2022
WO 2019053340 A1 3/2019
(Continued)

OTHER PUBLICATIONS

"Multiplexing and channel coding", 3rd Generation Partnership Project; Technical Specification Group Radio Access Network, 3GPP TS 38.212 V16.7.0, 3GPP Organizational Partners, Valbonne, France [retrieved Feb. 2, 2022]. Retrieved from the Internet <http://www.3gpp.org>., Sep. 2021, 153 Pages.
(Continued)

*Primary Examiner* — Jean B Corrielus
(74) *Attorney, Agent, or Firm* — FIG.1 Patents

(57) ABSTRACT

Various aspects of the present disclosure relate to artificial intelligence (AI) enabled beam management. A base station may notify a user equipment (UE) of an availability of AI-enabled beam management and provide configuration parameters for an AI algorithm. The UE may utilize the configuration parameters to configure an AI algorithm. The UE may process a first set of beams utilizing the configured AI algorithm to identify a second set of beams. The UE may notify the base station (and/or other network entity) of the second set of beams, and one or more beams of the second set of beams can be utilized for wireless communication between the UE and the base station and/or other network entity or UE.

20 Claims, 18 Drawing Sheets

(56) References Cited

U.S. PATENT DOCUMENTS

| | | | |
|---|---|---|---|
| 11,140,567 B2* | 10/2021 | Tsai | H04W 24/10 |
| 11,962,389 B2 | 4/2024 | Bhamri et al. | |
| 2017/0195033 A1* | 7/2017 | Zhang | H04L 5/005 |
| 2017/0346544 A1 | 11/2017 | Islam et al. | |
| 2018/0083753 A1 | 3/2018 | Nagaraja et al. | |
| 2018/0254809 A1* | 9/2018 | Huang | H04J 11/0053 |
| 2019/0150010 A1* | 5/2019 | Kwon | H04W 24/10 370/252 |
| 2019/0191425 A1* | 6/2019 | Zhu | H04B 7/088 |
| 2020/0044708 A1 | 2/2020 | Da Silva et al. | |
| 2020/0366326 A1 | 11/2020 | Jassal et al. | |
| 2021/0218461 A1 | 7/2021 | Raghavan et al. | |
| 2022/0150903 A1 | 5/2022 | Lee et al. | |
| 2022/0408381 A1 | 12/2022 | Pezeshki et al. | |
| 2023/0198604 A1 | 6/2023 | Bhamri et al. | |

FOREIGN PATENT DOCUMENTS

| | | | |
|---|---|---|---|
| WO | 2019168451 A1 | 9/2019 | |
| WO | 2019190368 A1 | 10/2019 | |

OTHER PUBLICATIONS

"Physical layer procedures for data", 3rd Generation Partnership Project; Technical Specification Group Radio Access Network, 3GPP TS 38.214 V16.7.0, 3GPP Organizational Partners, Valbonne, France [retrieved Feb. 2, 2022]. Retrieved from the Internet <http://www.3gpp.org>., Sep. 2021, 172 Pages.

U.S. Appl. No. 17/556,563, "Non-Final Office Action", U.S. Appl. No. 17/556,563, filed Apr. 20, 2023, 8 pages.

U.S. Appl. No. 17/556,563, "Non-Final Office Action", U.S. Appl. No. 17/556,563, filed Oct. 5, 2022, 8 pages.

U.S. Appl. No. 17/556,563, "Notice of Allowance", U.S. Appl. No. 17/556,563, filed Dec. 13, 2023, 15 pages.

Ekman, Björn , "Machine Learning for Beam Based Mobility Optimization in NR", Master of Science Thesis in Communication Systems, Department of Electrical Engineering, Linköping University [retrieved Feb. 4, 2022]. Retrieved from the Internet <https://www.diva-portal.org/smash/get/diva2:1088857/FULLTEXT01.pdf>., Apr. 2017, 85 pages.

NTT Docomo, Inc. , "Discussion on evaluation on AI/ML for beam management", 3GPP TSG RAN WG1 #109-e, R1-2204377, e-Meeting [retrieved Mar. 8, 2023]. Retrieved from the Internet <https://www.3gpp.org/ftp/tsg_ran/WG1_RL1/TSGR1_109-e/Docs>, May 2022, 7 pages.

PCT/IB2022/062498 , "International Search Report and Written Opinion", PCT Application No. PCT/IB2022/062498, Mar. 13, 2023, 16 pages.

Ruyue Li, Yu-Ngok , et al., "Beam Management in Millimeter-Wave Communications for 5G and Beyond", IEEE Access, vol. 8 [retrieved Feb. 4, 2022]. Retrieved from the Internet <https://doi.org/10.1109/ACCESS.2019.2963514>., Jan. 1, 2020, 12 pages.

* cited by examiner

```
-- ASN1START
-- TAG-MIB-START

MIB ::=                         SEQUENCE {
    systemFrameNumbeR           BIT STRING (SIZE (6)),
    subCarrierSpacingCommon     ENUMERATED {scs15or60, scs30or120},
    ssb-SubcarrierOffset        INTEGER (0..15),
    dmrs-TypeA-Position         ENUMERATED {pos2, pos3},
    pdcch-ConfigSIB1            PDCCH-ConfigSIB1,
    cellBarred                  ENUMERATED {barred, notBarred},
    intraFreqReselection        ENUMERATED {allowed, notAllowed},
    AI-beamAcquireRefine        BIT STRING (SIZE (1))
}

-- TAG-MIB-STOP
-- ASN1STOP
```

FIG. 2

| Index | AI Model Input Parameters | | AI Model Output Parameters | |
|---|---|---|---|---|
| | Min number of beam measurements | Max gap between beams | Number of output beams | Number of narrow beams within each SSB |
| 0 | 2 | 4 | 3 | 4 |
| 1 | 4 | 1 | 5 | - |
| 2 | 2 | 2 | - | 3 |
| 3 | ..... | ..... | ..... | ..... |
| ..... | ..... | ..... | ..... | ..... |

FIG. 6

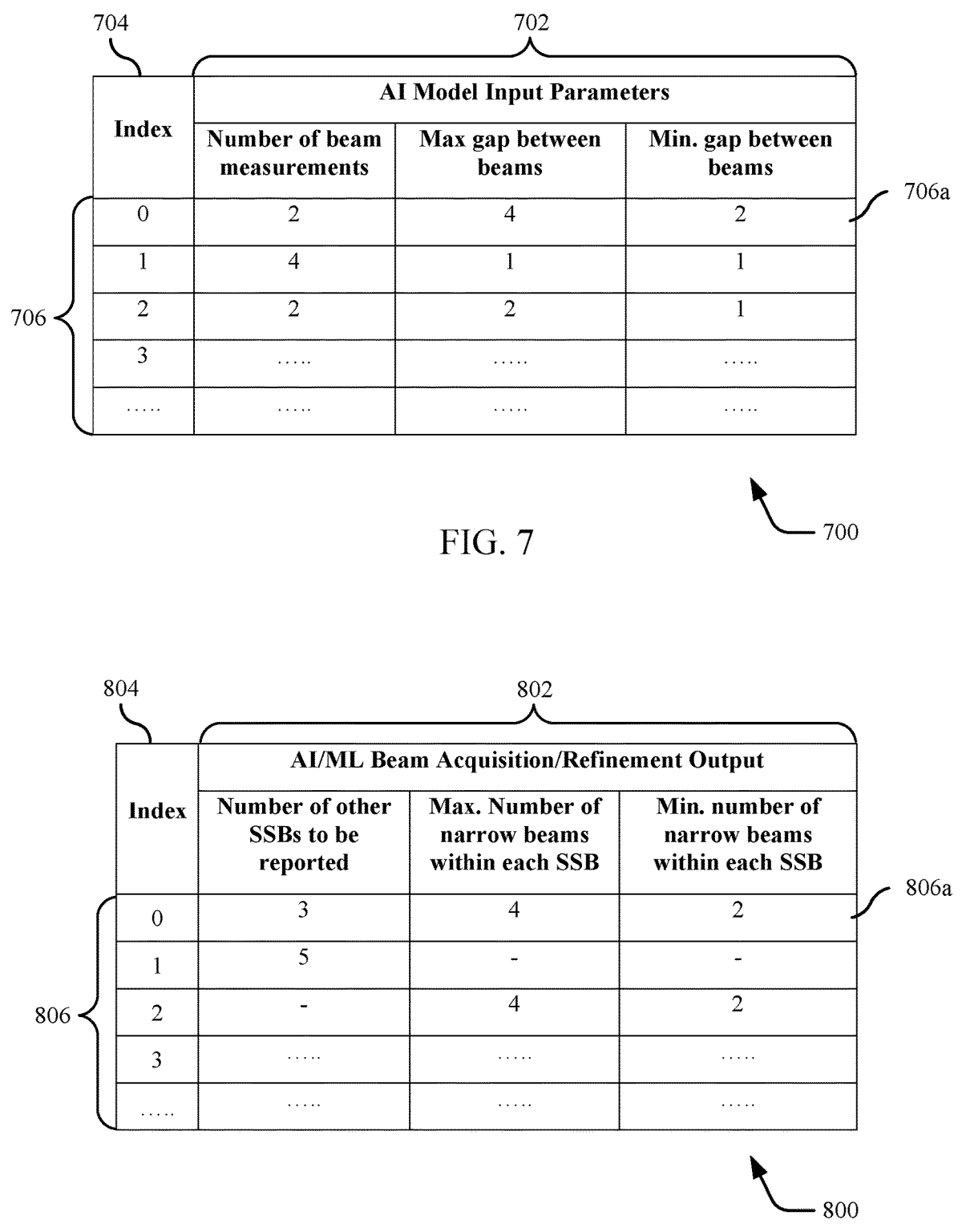

| Index | AI Model Input Parameters | | |
|---|---|---|---|
| | Number of beam measurements | Max gap between beams | Min. gap between beams |
| 0 | 2 | 4 | 2 |
| 1 | 4 | 1 | 1 |
| 2 | 2 | 2 | 1 |
| 3 | ..... | ..... | ..... |
| ..... | ..... | ..... | ..... |

FIG. 7

| Index | AI/ML Beam Acquisition/Refinement Output | | |
|---|---|---|---|
| | Number of other SSBs to be reported | Max. Number of narrow beams within each SSB | Min. number of narrow beams within each SSB |
| 0 | 3 | 4 | 2 |
| 1 | 5 | - | - |
| 2 | - | 4 | 2 |
| 3 | ..... | ..... | ..... |
| ..... | ..... | ..... | ..... |

| Index | Inferred Beams |
|---|---|
| 0 | $SSB_{ref} - 1$ |
| 1 | $SSB_{ref}$ (2/4) |
| 2 | $SSB_{ref} - 1$ (1/3) |
| 3 | $SSB_{ref}$ (4/4), $SSB_{ref} + 1$ (1/4) |
| ..... | ..... |

| Index | Inferred Beams |
|---|---|
| 0 | $SSB_{ref} - 1$ |
| 1 | $SSB_{ref}$ (2/4) |
| 2 | $SSB_{ref} - 1$ (1/3) |
| 3 | $SSB_{ref}$ (4/4) |
| 4 | $SSB_{ref} + 1$ (1/4) |
| ..... | ..... |

ARTIFICIAL INTELLIGENCE ENABLED BEAM MANAGEMENT

RELATED APPLICATION

This application is a continuation of and claims priority to U.S. patent application Ser. No. 17/556,563 filed Dec. 20, 2021, and now U.S. Pat. No. 11,962,389 issued Apr. 16, 2024, entitled "Artificial Intelligence Enabled Beam Management," the disclosure of which is incorporated by reference herein in its entirety.

TECHNICAL FIELD

The present disclosure relates to wireless communications, and more specifically to artificial intelligence (AI) and wireless communication.

BACKGROUND

A wireless communications system may include one or multiple network communication devices, such as base stations, which may be otherwise known as an eNodeB (eNB), a next-generation NodeB (gNB), or other suitable terminology. Each network communication device, such as a base station, may support wireless communications for one or multiple user communication devices, which may be otherwise known as user equipment (UE), or other suitable terminology. The wireless communications system may support wireless communications with one or multiple user communication devices by utilizing resources of the wireless communications system, such as time resources (e.g., symbols, subslots, slots, subframes, frames, or the like) or frequency resources (e.g., subcarriers, carriers). Additionally, the wireless communications system may support wireless communications across various radio access technologies including third generation (3G) radio access technology, fourth generation (4G) radio access technology, fifth generation (5G) radio access technology, and other suitable radio access technologies beyond 5G.

To enable a UE to acquire beams (also referred to as spatial beams) for wireless connectivity of the UE to a wireless network, the UE performs beam sweeping for available beams transmitted by the wireless network and measures attributes of the beams, such as signal strength and signal quality. The UE performs further beam sweeping for beam refinement to achieve a set of potentially narrower beams for wireless connectivity to the wireless network. This enables a wireless connection between the UE and the wireless network to achieve high directional precision and high signal quality for wireless signal transmission between the UE and the wireless network.

SUMMARY

The present disclosure relates to methods, apparatuses, and systems that support integration and implementations of AI enabled beam management. For instance, the present disclosure provides techniques for enabling a UE to utilize an AI algorithm to process beams detected and measured from a wireless network to infer other beams that may be of higher strength and/or higher quality. The UE may utilize an AI algorithm to correlate beam measurements, such as signal strength of received beams to infer other beams. The UE can notify the wireless network of the inferred beams, and wireless communication between the wireless network and the UE can be performed utilizing one or more of the inferred beams. By utilizing AI-enabled beam management, the UE can experience reduced latency and overhead, reduced power consumption, and increased signal quality in comparison with other beam management techniques.

Some implementations of the methods and apparatuses described herein may further include wireless communication at a device (e.g., a UE), which includes receiving a set of signals over a first set of beams; performing beam measurement on each beam of the first set of beams based at least in part on the received set of signals over the first set of beams; generating beam information for a second set of beams based at least in part on the performed beam measurements on the first set of beams, the beam information including a respective beam identifier for each beam of the second set of beams and beam measurements for the second set beams; and communicating, to a second device, beam information for at least one beam of the second set of beams for configuring the wireless communication between the device and the second device. In some implementations of the methods and apparatuses described herein, the beam identifier for the second set of beams may be associated with spatial relation in terms of directivity, beamwidth, and corresponding signal strength relative to the first set of beams. Additionally or alternatively, in some implementations of the methods and apparatuses described herein, the beam identifier for the second set of beams may be associated with an indication to a resource index for the received first set of beams that are associated with a reference signal resource.

In some implementations of the methods and apparatuses described herein, the beam information is generated by inputting the beam measurements from the first set of beams into an algorithm based on an AI algorithm, and receiving the beam information about the second set of beams as output from the algorithm.

Some implementations of the methods and apparatuses described herein may further include wireless communication at a device (e.g., a base station such as a gNB), which includes generating one or more notifications that include an indication for a second device to apply AI beam management, and algorithm configuration information including one or more of input configuration information or output configuration information for configuring operation of an AI algorithm at the second device to generate beam information; and communicating the one or more notifications for receipt by the second device for configuring wireless communication between the device and the second device.

BRIEF DESCRIPTION OF THE DRAWINGS

Various aspects of the present disclosure for AI enabled beam management are described with reference to the following Figures. The same numbers may be used throughout to reference like features and components shown in the Figures.

FIGS. 2-5 illustrate examples of different AI beam management notifications that support AI enabled beam management in accordance with aspects of the present disclosure.

FIGS. 6-8 illustrate different examples of AI beam management tables that support AI enabled beam management in accordance with aspects of the present disclosure.

FIGS. 9-12 illustrate different examples of beam association tables that support AI enabled beam management in accordance with aspects of the present disclosure.

DETAILED DESCRIPTION

Figure 1:
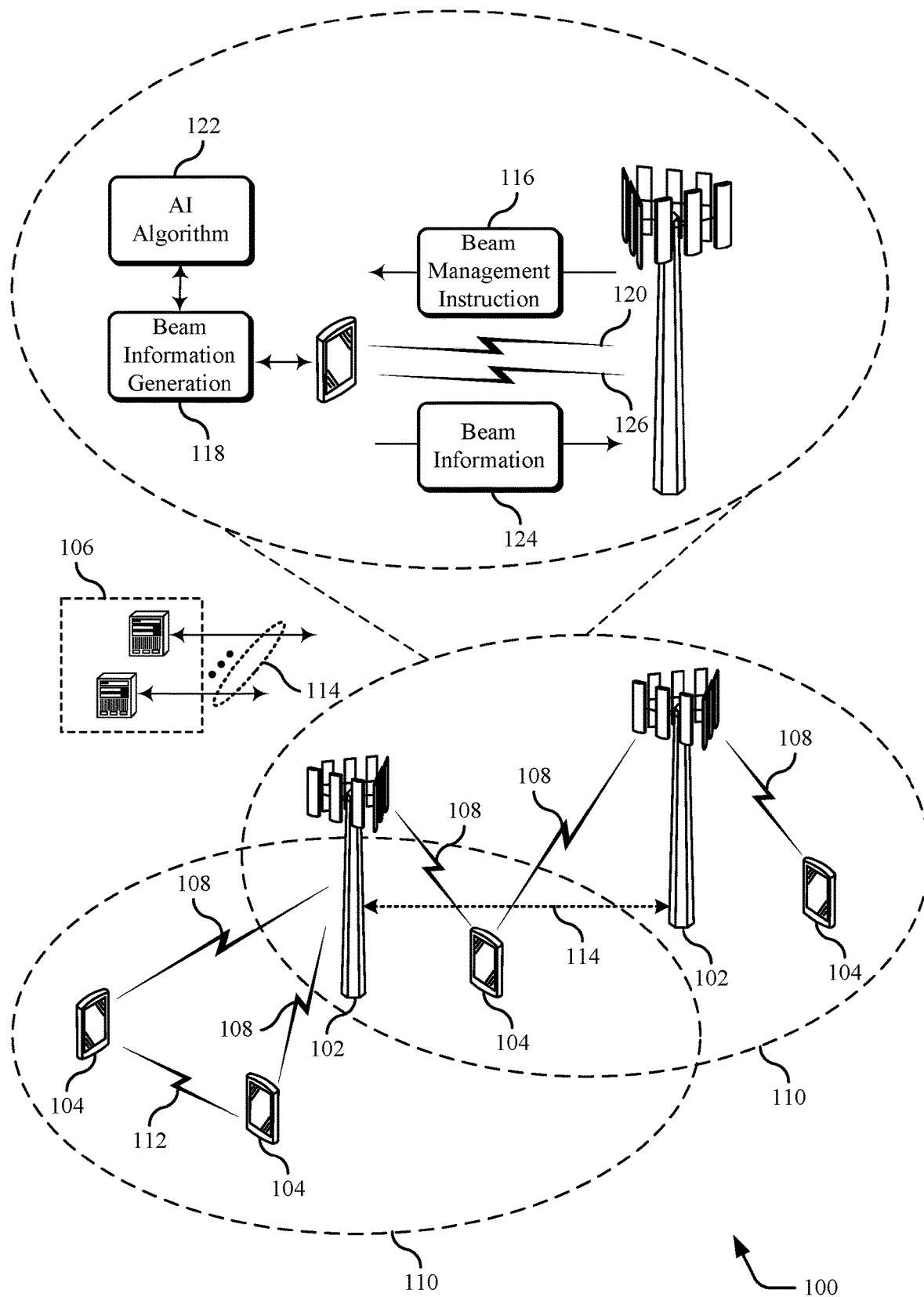
FIG. 1 illustrates an example of a wireless communications system that supports AI enabled beam management in accordance with aspects of the present disclosure.

Implementations of AI enabled beam management are described, such as related to utilizing AI-enabled beam management to identify beams for communication with a wireless network, e.g., a base station. For instance, as compared with some beam management protocols, by implementing AI-enabled beam management a UE can identify suitable beams for wireless communication with reduced power usage and processing in terms of beam measurements and corresponding reporting for a set of beams for wireless communication, such as by inferring beams that are not actually measured and received, and/or predicting beams for future transmission instance Some wireless communications systems might have no methods or protocols for enabling AI-enabled beam management. This causes a UE to utilize some beam management protocols that are power-intensive, latency prone and utilize large overhead. For instance, the inability to utilize AI-enabled beam management exhibited in some wireless communications systems may cause a particular UE to perform some beam sweeping, beam identification and/or acquisition, and beam refinement. In some wireless communications systems, for instance, a network and or a UE first performs beam sweeping to identify candidate beams, which may involve measuring multiple sets of beams to identify candidate beams. The UE then may perform further beam refinement to identify narrower beams within the initially identified candidate beams to utilize for wireless communication. These processes are time and power intensive and thus result in processing lag at a UE and reduction in power resources available to the UE.

Accordingly, to overcome such deficiencies in some wireless communications systems, this disclosure introduces comprehensive techniques for AI enabled beam management. For instance, the present disclosure provides techniques for enabling a wireless network (e.g., a base station) to notify a UE to implement AI-enabled beam management. Further, the wireless network can provide the UE with configuration parameters for configuring an AI algorithm at the UE. The UE receives the notification and implements AI-enabled beam management features. For instance, the UE configures an AI algorithm based on configuration parameters received from the wireless network. Further, the UE receives and measures a first set of beams from the wireless network and processes the first set of beams utilizing the AI algorithm to output ("infer") a second set of beams. The UE, for instance, infers the second set of beams independent of receiving and/or measuring the second set of beams. In at least one implementation the second set of beams are inferred by the AI algorithm to have a higher or at least same signal strength and/or signal quality than the first set of beams. The UE can notify the wireless network of the second set of beams, and wireless communication between the wireless network and the UE can be performed utilizing the second set of beams. By utilizing AI-enabled beam management, the UE can experience reduced latency, reduced overhead, reduced power consumption, and increased signal quality in comparison with some beam management techniques.

Aspects of the present disclosure are described in the context of a wireless communications system. Aspects of the present disclosure are further illustrated and described with reference to device diagrams and flowcharts that relate to AI enabled beam management.

FIG. 1 illustrates an example of a wireless communications system 100 that supports AI enabled beam management in accordance with aspects of the present disclosure. The wireless communications system 100 may include one or more base stations 102, one or more ULEs 104, and a core network 106. The wireless communications system 100 may support various radio access technologies. In some implementations, the wireless communications system 100 may be a 4G network, such as an LTE network or an LTE-Advanced (LTE-A) network. In some other implementations, the wireless communications system 100 may be a 5G network, such as an NR network. In other implementations, the wireless communications system 100 may be a combination of a 4G network and a 5G network. The wireless communications system 100 may support radio access technologies beyond 5G. Additionally, the wireless communications system 100 may support technologies, such as time division multiple access (TDMA), frequency division multiple access (FDMA), or code division multiple access (CDMA), etc.

The one or more base stations 102 may be dispersed throughout a geographic region to form the wireless communications system 100. One or more of the base stations 102 described herein may be or include or may be referred to as a base transceiver station, an access point, a NodeB, an eNodeB (eNB), a next-generation NodeB (gNB), a Radio Head (RH), a relay node, an integrated access and backhaul (IAB) node, or other suitable terminology. A base station 102 and a UE 104 may communicate via a communication link 108, which may be a wireless or wired connection. For example, a base station 102 and a UE 104 may perform wireless communication over a Uu interface.

A base station 102 may provide a geographic coverage area 110 for which the base station 102 may support services (e.g., voice, video, packet data, messaging, broadcast, etc.) for one or more UEs 104 within the geographic coverage area 110. For example, a base station 102 and a UE 104 may support wireless communication of signals related to services (e.g., voice, video, packet data, messaging, broadcast, etc.) according to one or multiple radio access technologies. In some implementations, a base station 102 may be moveable, for example, a satellite associated with a non-terrestrial network. In some implementations, different geographic coverage areas 110 associated with the same or different radio access technologies may overlap, but the different geographic coverage areas 110 may be associated with different base stations 102. Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The one or more UEs 104 may be dispersed throughout a geographic region of the wireless communications system 100. A UE 104 may include or may be referred to as a mobile device, a wireless device, a remote device, a handheld device, a customer premise equipment (CPE), or a subscriber device, or some other suitable terminology. In some implementations, the UE 104 may be referred to as a unit, a station, a terminal, or a client, among other examples. Additionally, or alternatively, the UE 104 may be referred to as an Internet-of-Things (IoT) device, an Internet-of-Everything (IoE) device, or machine-type communication (MTC) device, among other examples. In some implementations, a UE 104 may be stationary in the wireless communications system 100. In some other implementations, a UE 104 may be mobile in the wireless communications system 100.

The one or more UEs 104 may be devices in different forms or having different capabilities. Some examples of UEs 104 are illustrated in FIG. 1. A UE 104 may be capable of communicating with various types of devices, such as the base stations 102, other UEs 104, or network equipment (e.g., the core network 106, a relay device, an integrated access and backhaul (IAB) node, or another network equipment), as shown in FIG. 1. Additionally, or alternatively, a UE 104 may support communication with other base stations 102 or UEs 104, which may act as relays in the wireless communications system 100.

A UE 104 may also be able to support wireless communication directly with other UEs 104 over a communication link 112. For example, a UE 104 may support wireless communication directly with another UE 104 over a device-to-device (D2D) communication link. In some implementations, such as vehicle-to-vehicle (V2V) deployments, vehicle-to-everything (V2X) deployments, or cellular-V2X deployments, the communication link 112 may be referred to as a sidelink. For example, a UE 104 may support wireless communication directly with another UE 104 over a PC5 interface.

A base station 102 may support communications with the core network 106, or with another base station 102, or both. For example, a base station 102 may interface with the core network 106 through one or more backhaul links 114 (e.g., via an S1, N2, N2, or another network interface). The base stations 102 may communicate with each other over the backhaul links 114 (e.g., via an X2, Xn, or another network interface). In some implementations, the base stations 102 may communicate with each other directly (e.g., between the base stations 102). In some other implementations, the base stations 102 may communicate with each other indirectly (e.g., via the core network 106). In some implementations, one or more base stations 102 may include subcomponents, such as an access network entity, which may be an example of an access node controller (ANC). An ANC may communicate with the one or more UEs 104 through one or more other access network transmission entities, which may be referred to as a radio heads, smart radio heads, or transmission-reception points (TRPs).

The core network 106 may support user authentication, access authorization, tracking, connectivity, and other access, routing, or mobility functions. The core network 106 may be an evolved packet core (EPC), or a 5G core (5GC), which may include a control plane entity that manages access and mobility (e.g., a mobility management entity (MME), an access and mobility management functions (AMF)) and a user plane entity that routes packets or interconnects to external networks (e.g., a serving gateway (S-GW), a Packet Data Network (PDN) gateway (P-GW), or a user plane function (UPF)). In some implementations, the control plane entity may manage non-access stratum (NAS) functions, such as mobility, authentication, and bearer management for the one or more UEs 104 served by the one or more base stations 102 associated with the core network 106.

According to implementations for AI beam management for wireless communication, a UE 104 can identify beams for communication with a base station 102. For instance, in the wireless communications system 100, the base station 102 communicates a beam management instruction 116 to the UE 104. The beam management instruction 116, for instance, specifies that the UE 104 is to apply AI-enabled beam management if supported by the UE 104, such as part of beam acquisition and/or beam refinement. In at least one implementation, the beam management instruction 116 is transmitted via a Synchronization Signal Block (SSB) transmission and specifies configuration information for configuring operation of an AI algorithm at the UE 104. Examples of different notifications that can be utilized to generate and communicate the beam management instruction 116 are described below.

The UE 104 receives the beam management instruction 116 and performs beam information generation 118 on one or more beams 120 received from the base station 102. In at least one implementation the one or more beams 120 represent SSB beams, such as used to communicate the beam management instruction 116 from the base station 102. As part of the beam information generation 118, for instance, the UE 104 measures different attributes of the one or more beams 120, such as reference signal received power (RSRP), reference signal received quality (RSRQ), received signal strength indicator (RSSI), signal-to-interference and noise ratio (SINR), and so forth, to determine measurements for the one or more beams 120.

Further, the UE 104 configures operation of an AI algorithm 122 on the UE 104. The AI algorithm 122 can be configured based on various AI models, such as a neural network, a decision tree, a support vector machine, a linear regression, a logistic regression, a Bayesian network, random forest learning, dimensionality reduction algorithms, boosting algorithms, and combinations thereof. For example, based on configuration information indicated by the beam management instruction 116, the UE 104 configures operation of the AI algorithm 122. The UE 104 processes the measurements of the one or more beams 120 utilizing the AI algorithm 122 to generate beam information 124 that describes a second set of beams. In at least one implementation the UE 104 generates the beam information 124 independent of receiving and/or performing measurements on the second set of beams. The beam information 124, for instance, is inferred using the AI algorithm 122 and based on the measurements performed on the first set of beams 120. As described herein, the term "inferred" refers to operation of an AI algorithm to provide output from the AI algorithm such as the AI algorithm 122. The beam information 124, for instance, includes beam identifiers for the second set of beams. In at least one implementation beam identifiers are indicated as an association with spatial relation in terms of directivity, beamwidth, and/or corresponding signal strength relative to the first set of beams. Additionally or alternatively, beam identifiers for the second set of beams can be associated with an indication to a resource index for the received first set of beams that are associated with a reference signal resource, for example SSB index, Channel State Information Reference Signal (CSI-RS) index, and so forth.

The UE 104 communicates the beam information 124 to the base station 102 and wireless communication is established between the base station 102 and the UE 104 utilizing one or more beams 126 identified in the beam information 124.

To enable the AI algorithm 122 to operate according to implementations for AI-enabled beam management described herein, various model training techniques can be employed. For instance, the AI algorithm 122 can be trained in an offline mode, such prior to deployment of a UE 104. Alternatively or additionally the AI algorithm 122 can be trained in an online mode, such as after deployment of the UE 104 to a user. Further, the AI algorithm 122 can be periodically and/or continuously trained after deployment, such as using learned data pertaining the AI-enabled beam management obtained via application of aspects for AI-enabled beam management described herein, and/or training data obtained from other sources such as the core network 106.

As part of enabling a UE to acquire beams for connectivity to a wireless network in some wireless communications systems, various beam management operations are performed. Some beam management, for instance, includes a set of Layer 1 and Layer 2 procedures to acquire and maintain a set of beam pair links, i.e., a beam used at transmit-receive point(s) (TRP(s)) for a base station side paired with a beam used at a UE. The beam pair links can be used for downlink (DL) and uplink (UL) transmission/reception. Some beam management procedures include at least the following aspects:

(1) Beam sweeping operation performed on a covering a spatial area with beams transmitted and/or received during a time interval in a predetermined way;
(2) Beam measurement for TRP(s) or UE to measure characteristics of received beamformed (BF) signals;
(3) Beam reporting for a UE to report information of BF signal(s) based on beam measurement;
(4) Beam determination for TRP(s) or UE to select transmit/receive beam(s);
(5) Beam maintenance: for TRP(s) or UE to maintain the candidate beams by beam tracking or refinement to adapt to the channel changes due to UE movement or blockage; and
(6) Beam recovery for a UE to identify new candidate beam(s) after detecting beam failure and subsequently inform TRP of beam recovery request with information of indicating the new candidate beam(s).

For uplink beam management in convention wireless communications systems, two transmission schemes, codebook-based transmissions and non-codebook based transmissions, are supported for Physical Uplink Shared Channel (PUSCH) determination. For PUSCH transmission(s) dynamically scheduled by an UL grant in a downlink control information (DCI), a UE upon detection of a Physical Downlink Control Channel (PDCCH) with a configured DCI format 0_0 or 0_1 transmits the corresponding PUSCH as indicated by the DCI.

For PUSCH scheduled by DCI format 0_0 on a cell, a UE transmits PUSCH according to the spatial relation, if applicable, corresponding to the physical uplink control channel (PUCCH) resource with the lowest identity (ID) within the active UL Bandwidth Part (BWP) of the cell, and the PUSCH transmission is based on a single antenna port. A spatial setting for a PUCCH transmission is provided by higher layer parameter PUCCH-SpatialRelationInfo if the UE is configured with a single value for higher layer parameter PUCCH-SpatialRelationInfold; otherwise, if the UE is provided multiple values for higher layer parameter PUCCH-SpatialRelationInfo, the UE determines a spatial setting for the PUCCH transmission based on a received PUCCH spatial relation activation/deactivation Medium Access Control (MAC) Control Element (CE). The UE applies a corresponding setting for a spatial domain filter to transmit PUCCH 3 msec after the slot where the UE transmits Hybrid Automatic Repeat Request-Acknowledgement (HARQ-ACK) information with ACK value corresponding to a PDSCH reception providing the PUCCH-SpatialRelationInfo.

For codebook-based transmission, PUSCH can be scheduled by DCI format 0_0 or DCI format 0_1. If a PUSCH is scheduled by DCI format 0_1, the UE determines its PUSCH transmission precoder based on Sounding Reference Signal Resource Indicator (SRI), transmit precoding matrix indicator (TPMI) and the transmission rank from the DCI, given by DCI fields of a Sounding Reference Signal (SRS) resource indicator and Precoding information and a specified number of layers. The TPMI is used to indicate the precoder to be applied over the antenna ports $\{0 \ldots v-1\}$ and that corresponds to the SRS resource selected by the SRI (unless a single SRS resource is configured for a single SRS-ResourceSet set to 'codebook'). The transmission precoder is selected from the uplink codebook that has a number of antenna ports equal to higher layer parameter nrofSRS-Ports in the parameter SRS-Config. When the UE is configured with the higher layer parameter txConfig set to 'codebook', the UE is configured with at least one SRS resource. The indicated SRI in slot n is associated with the most recent transmission of SRS resource identified by the SRI, where the SRS resource is prior to the PDCCH carrying the SRI before slot n. The UE determines its codebook subsets based on TPMI and upon the reception of higher layer parameter codebookSubset in PUSCH-Config which may be configured with 'fullyAndPartialAndNonCoherent', or 'partialAndNonCoherent', or 'nonCoherent' depending on the UE capability. The maximum transmission rank may be configured by the higher parameter maxRank in PUSCH-Config.

For non-codebook based transmission, PUSCH can be scheduled by DCI format 0_0 or DCI format 0_1. The UE can determine its PUSCH precoder and transmission rank based on the wideband SRI when multiple SRS resources are configured in a SRS resource set with higher layer parameter usage in SRS-ResourceSet set to 'nonCodebook', where the SRI is given by the SRS resource indicator in DCI format 0_1 and only one SRS port is configured for each SRS resource. The indicated SRI in slot n is associated with the most recent transmission of SRS resource(s) identified by the SRI, where the SRS transmission is prior to the PDCCH carrying the SRI before slot n.

Further, the UE performs one-to-one mapping from the indicated SRI(s) to the indicated DeModulation Reference Signal (DM-RS) ports(s) given by DCI format 0_1 in increasing order.

For PUSCH scheduled by DCI format 0_0 on a cell and if the higher layer parameter enableDefaultBeamPlForPUSCH0_0 is set 'enabled', the UE is not configured with PUCCH resources on the active UL BWP and the UE is in Radio Resource Control (RRC) connected mode, the UE transmits PUSCH according to the spatial relation, if applicable, with a reference to the RS with 'QCL-Type-D' corresponding to the QCL assumption of the CORESET with the lowest ID. For PUSCH scheduled by DCI format 0_0 on a cell and if the higher layer parameter enableDefaultBeamPlForPUSCH0_0 is set 'enabled', the UE is configured with PUCCH resources on the active UL BWP where all the PUCCH resource(s) are not configured with any spatial relation and the UE is in RRC connected mode, the UE transmits PUSCH according to the spatial relation, if applicable, with a reference to the RS with 'QCL-Type-D' corresponding to the QCL assumption of the CORESET with the lowest ID in case CORESET(s) are configured on the CC.

For DL beam management in convention wireless communications systems, one approach to handling CSI reporting feedback for beam management is to use group-based beam reporting. For CSI reporting, the following are specified:

If the UE is configured with a CSI-ReportConfig with the higher layer parameter reportQuantity set to 'cri-RSRP' or 'ssb-Index-RSRP':
  if the UE is configured with the higher layer parameter groupBasedBeamReporting set to 'disabled', the UE is not required to update measurements for more than 64 CSI-RS and/or Synchronization Signal Block (SSB) resources, and the UE is to report in a single report nrofReportedRS (higher layer configured) different CRI or SS Block Resource Index (SSBRI) for each report setting; and
  if the UE is configured with the higher layer parameter groupBasedBeamReporting set to 'enabled', the UE is not required to update measurements for more than 64 CSI-RS and/or SSB resources, and the UE is to report in a single reporting instance two different CRI or SSBRI for each report setting, where CSI-RS and/or SSB resources can be received simultaneously by the UE either with a single spatial domain receive filter, or with multiple simultaneous spatial domain receive filters.

If the UE is configured with a CSI-ReportConfig with the higher layer parameter reportQuantity set to 'cri-SINR' or 'ssb-Index-SINR':
  if the UE is configured with the higher layer parameter groupBasedBeamReporting set to 'disabled', the UE is to report in a single report nrofReportedRSForS-INR (higher layer configured) different CRI or SSBRI for each report setting; and
  if the UE is configured with the higher layer parameter groupBasedBeamReporting set to 'enabled', the UE is to report in a single reporting instance two different CRI or SSBRI for each report setting, where CSI-RS and/or SSB resources can be received simultaneously by the UE either with a single spatial domain receive filter, or with multiple simultaneous spatial domain receive filters.

In some wireless communications systems for determining Quasi Co-Location (QCL) of antenna ports as part of beam management, a single QCL type (i.e., qcl-typeD) is utilized for determining spatial relation between a source RS and target RS. This means that only a single source to single target beam association can be established. However, for higher in frequencies, the number of beams could become higher. Therefore, more coarse association could be considered to cover wider areas.

In some implementation for QCL as part of beam management, a UE can be configured with a list of up to M Transmission Configuration Indicator (TCI)-State configurations within the higher layer parameter PDSCH-Config to decode PDSCH according to a detected PDCCH with DCI intended for the UE and the given serving cell, where M depends on the UE capability maxNumberConfiguredT-CIstatesPerCC. Each TCI-State contains parameters for configuring a quasi co-location relationship between one or two downlink reference signals and the DM-RS ports of the PDSCH, the DM-RS port of PDCCH or the CSI-RS port(s) of a CSI-RS resource. The quasi co-location relationship is configured by the higher layer parameter qcl-Type1 for the first DL RS, and qcl-Type2 for the second DL RS (if configured). For the case of two DL RSs, the QCL types is not be the same, regardless of whether the references are to the same DL RS or different DL RSs. The quasi co-location types corresponding to each DL RS are given by the higher layer parameter qcl-Type in QCL-Info and may take one of the following values:
  'QCL-TypeA': {Doppler shift, Doppler spread, average delay, delay spread}
  'QCL-TypeB': {Doppler shift, Doppler spread}
  'QCL-TypeC': {Doppler shift, average delay}
  'QCL-TypeD': {Spatial Rx parameter}

Accordingly, based at least on this discussion of beam management operations in some systems, it is apparent that some beam management techniques are complex and utilize a multitude of operations that introduce lag into beam management processes and utilize significant power resources of UEs.

This disclosure provides a framework for enabling wireless networks and UEs to utilize AI-enabled beam management for beam identification and beam refinement and in some instances beam prediction such as for inferring beams for future signal transmission. For instance, a wireless network implements a set of notifications configured to notify a UE of the availability of AI-enabled beam management. Further, the notifications can specify specific configuration parameters for an AI algorithm. A UE that receives the notifications can implement AI-enabled beam management for wireless communication with the wireless network.

FIGS. 2-5 present some example notification types that can be implemented to enable AI enabled beam management, such as to optimize beam acquisition and refinement for wireless communication between a UE 104 and a wireless network. The described notifications, for example, represent instances of the beam management instruction 116 described with reference to the wireless communications system 100. Further, the notifications can be implemented as separate notifications and/or can be combined to generate integrated notifications that include different parameters pertaining to AI enabled beam management. The described notifications can be implemented in various ways such as information elements, new AI beam management notifications, novel extensions of existing wireless notifications, and so forth. The described notifications are presented for purpose of example only and it is to be appreciated that a variety of different types and forms of notifications can be utilized in accordance with the described and claimed implementations.

FIG. 2 illustrates an example of an AI beam management notification 200 that supports AI enabled beam management in accordance with aspects of the present disclosure. The AI beam management notification 200 may implement or be implemented by aspects of the wireless communications system 100. In this example the AI beam management notification 200 represents an instance of a Master Information Block (MIB) configured with system information for a wireless network. The AI beam management notification 200, for instance, represents an enhanced MIB. This is not to be construed as limiting, however, and the AI beam management notification 200 can be implemented in a variety of different ways.

The AI beam management notification 200 includes an AI beam management field 202 that is configurable to specify whether a UE that receives the AI beam management notification 200 is to apply AI-enabled beam management. The AI beam management field 202, for instance, includes a bit field 204 that can be set to "1" to indicate that a UE is to apply AI-enabled beam management if supported by the UE, and to "0" to indicate that a UE is to utilize non-AI-enabled beam management. In the context of an MIB implementation, the AI beam management field 202 can be implemented, for instance, via a spare bit field available in the MIB.

Figure 3:
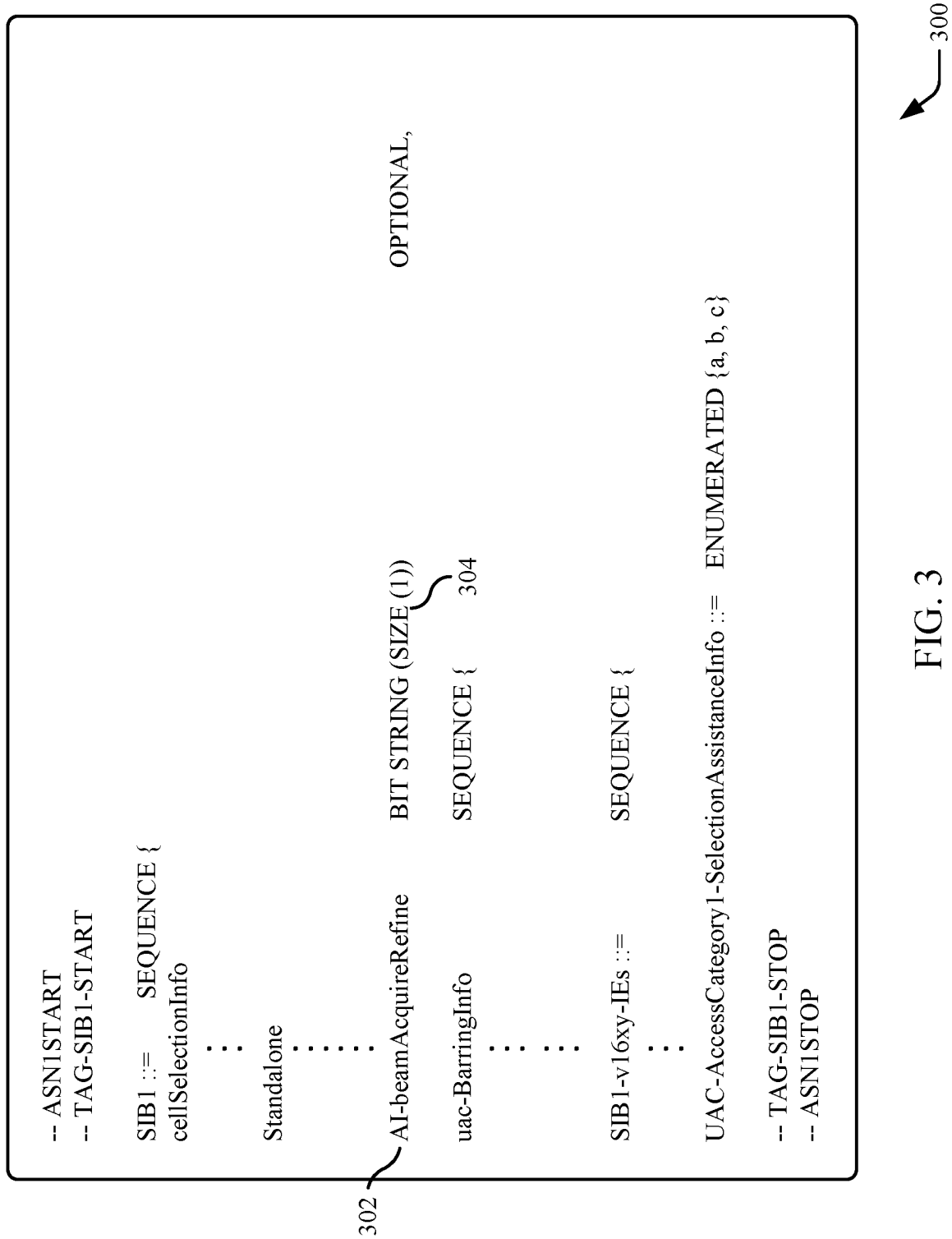

FIG. 3 illustrates an example of an AI beam management notification 300 that supports AI enabled beam management in accordance with aspects of the present disclosure. The AI beam management notification 300 may implement or be implemented by aspects of the wireless communications system 100. In this example the AI beam management notification 300 represents an instance of a System Information Block (SIB) (e.g., a SIB1) configured with system information for a wireless network. The AI beam management notification 300, for instance, represents an enhanced SIB. This is not to be construed as limiting, however, and the AI beam management notification 300 can be implemented in a variety of different ways.

The AI beam management notification 300 includes an AI beam management field 302 that is configurable to specify whether a UE that receives the AI beam management notification 300 is to apply AI-enabled beam management. The AI beam management field 302, for instance, includes a bit field 304 that can be set to "1" to indicate that a UE is to apply AI-enabled beam management if supported by the UE, and to "0" to indicates that a UE is to utilize non-AI-enabled beam management.

Figure 4:
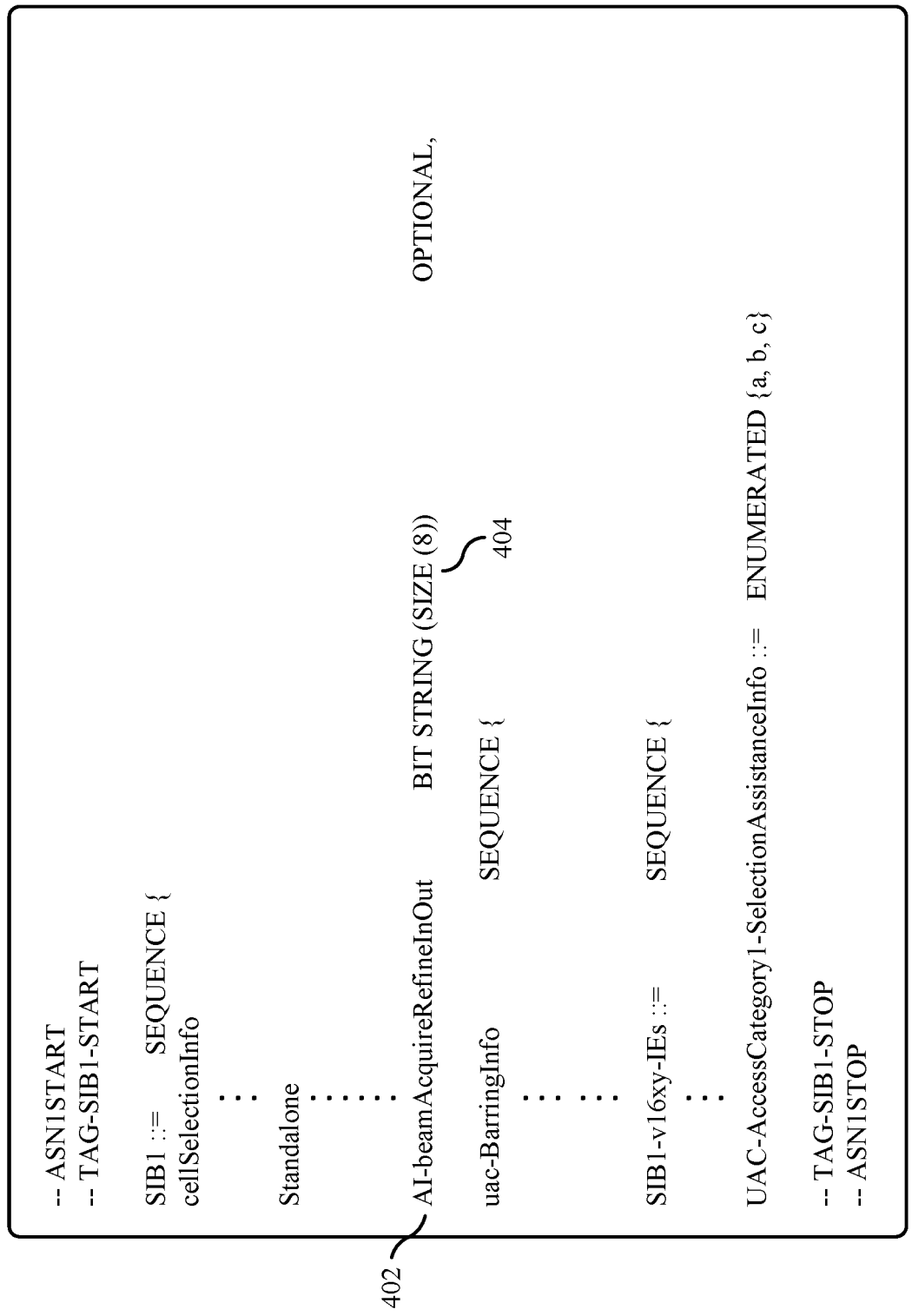

FIG. 4 illustrates an example of an AI beam management notification 400 that supports AI enabled beam management in accordance with aspects of the present disclosure. The AI beam management notification 400 may implement or be implemented by aspects of the wireless communications system 100. In this example the AI beam management notification 400 represents an instance of an SIB (e.g., an SIB1) configured with system information for a wireless network. The AI beam management notification 400, for instance, represents an enhanced SIB. This is not to be construed as limiting, however, and the AI beam management notification 400 can be implemented in a variety of different ways.

The AI beam management notification 400 includes an AI beam management field 402 that is configurable to specify whether a UE that receives the AI beam management notification 400 is to apply AI-enabled beam management as well as parameters for applying AI-enabled beam management. The AI beam management field 402, for instance, includes a bit field 404 that can be set with a bit string (e.g., a bitmap) that specifies parameters for applying AI-enabled beam management by a UE. For example, and as detailed below, a UE can be configured with a beam management table and/or set of beam management tables that specify different configuration information for applying AI-enabled beam management. Thus, the bit field 404 can be populated with a bit string that is utilized as an index value for a configuration table for identifying configuration information within a beam management table.

Figure 5:
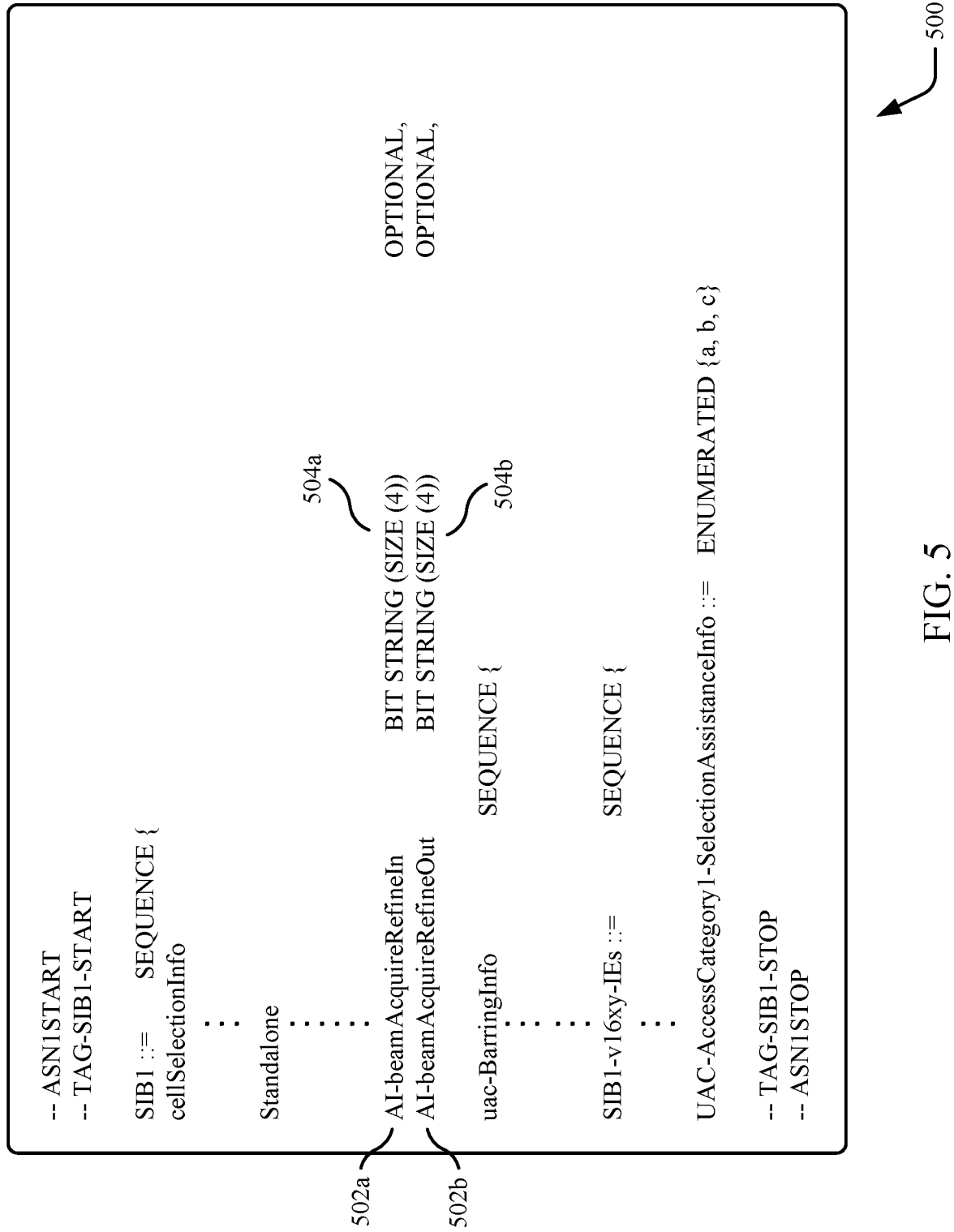

FIG. 5 illustrates an example of an AI beam management notification 500 that supports AI enabled beam management in accordance with aspects of the present disclosure. The AI beam management notification 500 may implement or be implemented by aspects of the wireless communications system 100. In this example the AI beam management notification 500 represents an instance of an SIB (e.g., a SIB1) configured with system information for a wireless network. The AI beam management notification 500, for instance, represents an enhanced SIB. This is not to be construed as limiting, however, and the AI beam management notification 500 can be implemented in a variety of different ways.

The AI beam management notification 500 includes an AI beam management field 502a and an AI beam management field 502b that are configurable to specify whether a UE that receives the AI beam management notification 500 is to apply AI-enabled beam management as well as parameters for applying AI-enabled beam management. The AI beam management field 502a, for instance, includes a bit field 504a, and the AI beam management field 502b includes a bit field 504b. The bit fields 504a, 504b can be set with different respective bit strings (e.g., bitmaps) that specify parameters for applying AI-enabled beam management by a UE. For example, and as detailed below, a UE can be configured with a beam management table and/or set of beam management tables that specify different configuration information for applying AI-enabled beam management. Thus, the bit fields 504a, 504b can be populated with bit strings that are utilized as an index values for different respective beam management tables for identifying configuration information within the respective beam management tables.

Configuration information that can be identified using the AI beam management notifications discussed above include input configuration information and output configuration information for configuring operation of AI algorithm implemented for performing aspects of AI beam management. Input configuration information, for example specifies parameters for beam information to be input into an AI algorithm. Examples of different input parameters for input to an AI algorithm include:

a minimum number of beams (e.g., SSB beams) to be measured;

a minimum value for one or more of RSRP, RSSI, RSRQ, or SINR for individual beams to be measured;

a minimum gap between individual beams to be measured—a gap can be specified in different ways, such as in terms of beam index and/or relative difference in orientation between receive (RX) beams;

a maximum gap between individual beams to be measured—a gap can be specified in different ways, such as in terms of beam index and/or relative difference in orientation between RX beams;

a fixed gap between individual beams to be measured—a gap can be specified in different ways, such as in terms of beam index and/or relative difference in orientation between RX beams;

a maximum allowed latency to infer beam information from a set of input beams; and a minimum accuracy of inferred beams and corresponding inferred measurements; In at least some implementations minimum accuracy can be specified as a minimum confidence level on output from an AI algorithm, for instance a minimum confidence level of 90% may imply that at least a 90% accuracy and/or reliability value is indicated by the AI algorithm.

Further, output configuration information specifies parameters for inferred beam information to be received as output from an AI algorithm. Examples of different output parameters for output from an AI algorithm include:

Beam Acquisition and/or prediction—parameters for inferring a set of beams as output from an AI algorithm utilizing a different, received set of beams:
  Minimum number of output beams;
  Minimum required RSRP, RSSI, RSRQ, and/or SINR value(s) of output SSB beams;
  Minimum difference between the RSRP, RSSI, RSRQ, and/or SINR value(s) of the output beams that is greater than the value(s) for an input beam with highest RSRP, RSSI, RSRQ, and/or SINR value(s);
  Minimum accuracy of the output beams and corresponding inferred measurements.

Beam Refinement—parameters for inferring narrower beams from a set of input beams and/or a set of output beams:
  Minimum number of narrower beams to output for an input beam and/or an output beam;
  Maximum number of narrower beams to output for an input beam and/or an output beam;
  Minimum number of total narrower beams to output for multiple input beams and/or an output beams;
  Minimum RSRP, RSSI, RSRQ, and/or SINR value(s) of output narrower beams;
  Minimum difference between the RSRP, RSSI, RSRQ, and/or SINR value(s) of the output narrower beams that is greater than the value(s) for an input beam and/or output beam with highest RSRP, RSSI, RSRQ, and/or SINR value(s); and
  Minimum accuracy of the output narrower beams and corresponding inferred measurements.

In at least some implementations, input configuration parameters and/or output configuration parameters and corresponding values are dependent on subcarrier spacing, frequency range, channels, number of total SSBs, reliability parameters, latency parameters, or combinations thereof.

FIGS. 6-8 illustrate different examples of AI beam management tables that support AI enabled beam management in accordance with aspects of the present disclosure. In at least one implementation the AI beam management tables are stored on a UE. For instance, an entity such as a device manufacturer and/or a wireless carrier configures a UE with an instance and/or instances of the AI beam management tables, such as prior to UE deployment and/or after UE deployment.

FIG. 6 illustrates an example of an AI beam management table 600 that supports AI enabled beam management in accordance with aspects of the present disclosure. The AI beam management table 600 may implement or be implemented by aspects of the wireless communications system 100. The AI beam management table 600 is configured to provide both input configuration parameters and output configuration parameters for use in configuring operation of an AI algorithm according to the described techniques. For instance, the AI beam management table 600 includes an input parameters region 602 and an output parameters region 604. The input parameters region 602 specifies configuration parameters for input to an AI algorithm, and the output parameters region 604 specifies configuration parameters for output from an AI algorithm.

For instance, the input parameters region 602 includes minimum number of beam measurements parameter which corresponds to a minimum number of beams to be measured, and maximum gap between beams parameters. The output parameters region 604 includes a number of output beams to be reported parameter (e.g., reported to a wireless network), and a number of narrow beams within each SSB beam to be reported parameter. As discussed herein a "narrow beam" represents a beam with a narrow bandwidth than a bandwidth of an associated SSB beam, e.g., a reference SSB beam.

The AI beam management table 600 also includes an index column 606 and configuration records 608. The index column 606 can be populated with different index values that correspond to different instances of the configuration records 608. The configuration records 608 include different configurations of the input parameters and the output parameters. For instance, an index value of "0" from the index column 606 corresponds to a configuration record 608a. Further, input parameters for the configuration record 608a include a value of "2" for a minimum number of beams to be measured, and a value of "4" for a maximum gap between beams. Output parameters for the configuration record 608a include a value of "3" for a number of output beams to be reported, and value of "4" for a number of narrow beams within each SSB to be reported.

According to various implementations, a wireless network can specify which configuration record 608 to apply as part of AI-enabled beam management. For instance, to identify an instance of a configuration record 608, a base station transmits the AI beam management notification 400 to a UE with the bit field 404 of the AI beam management notification 400 configured with an index value that represents one of the index values from the index field column 606 that corresponds to the instance of the configuration records 608. The UE receives the AI beam management notification 400 and identifies the index value from the bit field 404. The UE correlates the index value to the AI beam management table 600 to identify the instance of the configuration records 608. The UE utilizes the configuration parameters specified by the instance of the configuration records 608 to configure operation of an AI algorithm for identifying beams for use in wireless communication over the wireless network.

FIG. 7 illustrates an example of an AI beam management table 700 that supports AI enabled beam management in accordance with aspects of the present disclosure. The AI beam management table 700 may implement or be implemented by aspects of the wireless communications system 100. The AI beam management table 700 is configured to provide input configuration parameters for use in configuring operation of an AI algorithm according to the described techniques. For instance, the AI beam management table 700 includes an input parameters region 702 that specifies configuration parameters for input to an AI algorithm.

The AI beam management table 700 also includes an index column 704 and configuration records 706. The index column 704 can be populated with different index values that correspond to different instances of the configuration records 706. The configuration records 706 include different configurations of the input parameters. For instance, an index value of "0" from the index column 704 corresponds to a configuration record 706a. Further, input parameters for the configuration record 706a include a value of "2" for a minimum number of beams to be measured, a value of "4" for a maximum gap between beams, and a value of "2" for a minimum gap between beams.

FIG. 8 illustrates an example of an AI beam management table 800 that supports AI enabled beam management in accordance with aspects of the present disclosure. The AI beam management table 800 may implement or be implemented by aspects of the wireless communications system 100. The AI beam management table 800 is configured to provide output configuration parameters for use in configuring operation of an AI algorithm according to the described techniques. For instance, the AI beam management table 800 includes an output parameters region 802 that specifies configuration parameters for output from an AI algorithm.

The AI beam management table 800 also includes an index column 804 and configuration records 806. The index column 804 can be populated with different index values that correspond to different instances of the configuration records 806. The configuration records 806 include different configurations of the output parameters. For instance, an index value of "0" from the index column 804 corresponds to a configuration record 806a. Further, input parameters for the configuration record 806a include a value of "3" for a minimum number of beams to be output, a value of "4" for a maximum number of narrow beams to be output, and a value of "2" for a minimum number of narrow beams to be reported.

According to implementations described in this disclosure, the AI beam management tables 700, 800 can be utilized individually and/or in combination. For instance, a wireless network can utilize an instance of the AI beam management notifications described above to identify which instance of the AI beam management tables 700, 800 to utilize, and which configuration record from the identified AI beam management table to implement.

Alternatively or additionally, a wireless network specify to utilize both of the AI beam management tables 700, 800, and can specify which configuration record to utilize from each AI beam management table. For instance, using the AI beam management notification 500, a wireless network can configure the bit field 504a of the AI beam management field 502a to include bit values that specify that the AI beam management table 700 is to be utilized, and to identify a configuration record 706 to be applied. Further, the wireless network can configure the bit field 504b of the AI beam management field 502b to specify that the AI beam management table 800 is to be utilized, and to identify a configuration record 806 to be applied.

These examples of AI beam management tables are presented for purpose of example, and a wide variety of different configurations and implementations for identifying input parameters and output parameters can be utilized in accordance with implementations for AI beam management for wireless communication. Further, in performing AI-enabled beam management, a UE can utilize other input parameters and/or output parameters not specifically identified by a wireless network. For instance, a wireless network can specify values for a subset of input parameters and/or output parameters and a UE can utilize other input parameters and/or output parameters in addition to the specified subset.

FIGS. 9-12 illustrate different examples of beam association tables that support AI enabled beam management in accordance with aspects of the present disclosure. In at least one implementation the beam association tables are implemented at a wireless network (e.g., at a base station) and/or a UE for identifying beams that a UE identifies via AI-enabled beam management.

In at least some implementations, utilizing the described beam association tables, a UE reports to a wireless network identified one or more SSB beams, one or more inferred narrower beams, and/or a combinations thereof, during a random access channel (RACH) procedure (e.g., for one or more of Contention Based Random Access (CBRA) or Contention Free Random Access (CFRA) procedures) to inform the wireless network to apply the identified beam(s) for further transmission to the UE. The identified beam(s), for instance, represent output of an AI algorithm applied at the UE for beam acquisition and/or beam refinement.

For instance, a UE identifies one or more beams using an UL message, and/or the UE is preconfigured with a beam association table that indicates a relationship of the identified beams with respect to a reference SSB beam. In at least one implementation, the reference SSB beam can be implicitly indicated to the network by transmitting a physical random access channel (PRACH) on an associated PRACH resource from with a reference SSB beam was received, and the identified beams can be indicated by the signaling tone of via indices of a respective beam association table and/or set of tables.

In an alternative or additional implementation, a UE explicitly sends a beam association table and/or one or more index values for a beam association table using Msg3 PUSCH or implicitly using a Demodulation Reference Signal (DMRS) sequence of Msg3. In another alternative or additional implementation, one or more bits for identifying a table index value can be implicitly signaled using a PRACH transmission. Based on the size of the reporting signal, for example, the UE is configured with multiple root sequence index values to generate a PRACH preamble. The UE selects the root sequence index to generate the preamble, where the index represents one or more index values of a beam association table. In yet another example implementation, a UE report for indicating one or more beams from a beam association table can be divided into multiple parts, where one part (one or more bits) is signaled using PRACH, and other parts can be sent by Msg3 or after a connection to the wireless network using PUCCH/PUSCH.

FIG. 9 illustrates an example of a beam association table 900 that supports AI enabled beam management in accordance with aspects of the present disclosure. The beam association table 900 may implement or be implemented by aspects of the wireless communications system 100. The beam association table 900 includes an index column 902 and a beam association records 904. The index column 902 can be populated with different index values that correspond to different instance of the beam association records 904. The beam association records 904 each identify a set of one or more beams. In this particular example the beam association records 904 each identify a particular beam set of one or more beams in the context of a reference SSB ("$SSB_{ref}$"). A reference SSB, for example, represents an SSB beam that a UE receives from a wireless network and utilizes to perform AI-enabled beam management.

In the beam association table 900, in a beam association record 904a, SSBref−1 identifies an SSB beam with a lower index or alternatively, a neighboring SSB beam in counterclockwise direction from $SSB_{ref}$. In the beam association record 904b, $SSB_{ref}$ (2/4) indicates that the UE identified 4 narrower beams in $SSB_{ref}$ and that a $2^{nd}$ narrow beam among the 4 beams is identified as a suitable refined beam. The 4 narrower beams can be indicated in a clockwise direction from $1^{st}$ to $4^{th}$ narrow beam. In the beam association record 904c, $SSB_{ref}$−1 (1/3) indicates that the UE identified 3 narrow beams in a first neighboring SSB beam to the reference SSB beam in counterclockwise direction and is indicating the 1st narrow beam among the 3 as a suitable refined beam. In the beam association record 904d, $SSB_{ref}$ (4/4), $SSB_{ref}$+1 (1/4) indicates two optimal beams, where the first optimal beam is the 4th narrow beam among the total of 4 narrow beams inferred within the reference SSB beam and the second optimal beam is the 1st narrow beam among the 4 narrow beams identified within the first neighbor to the reference SSB beam in clockwise direction.

FIG. 10 illustrates an example of a beam association table 1000 that supports AI enabled beam management in accordance with aspects of the present disclosure. The beam association table 1000 may implement or be implemented by aspects of the wireless communications system 100. The beam association table 1000 includes an index column 1002 and a beam association records 1004 that identify different beams. In this particular example each beam association record includes a single entry characterizing a single beam association. To utilize the beam association table 1000 a UE may provide a single index value to identify a single instance of a beam association record 1004, or may provide multiple index values to identify a combination of beam association records 1004. For instance, an identified beam codepoint reported by the UE may correspond to two SSB/beam pairs, e.g., a codepoint corresponding to index values of 3, 4, together, for respective beam association records 1004.

Figure 11:
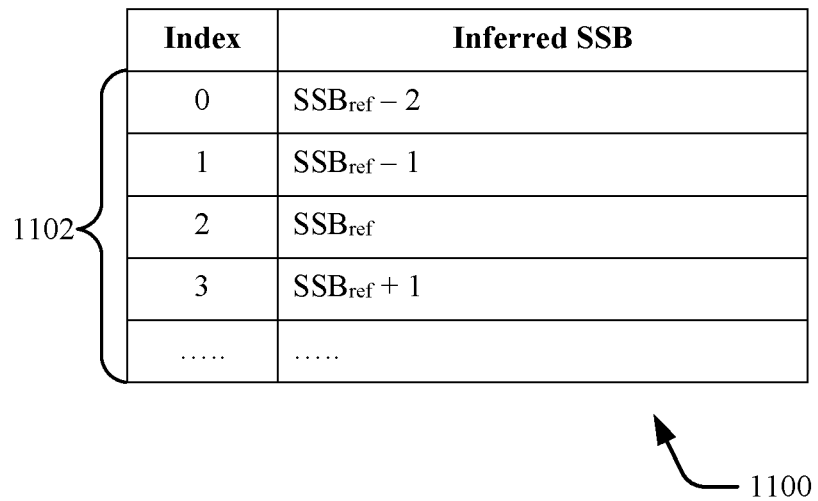
Figure 12:
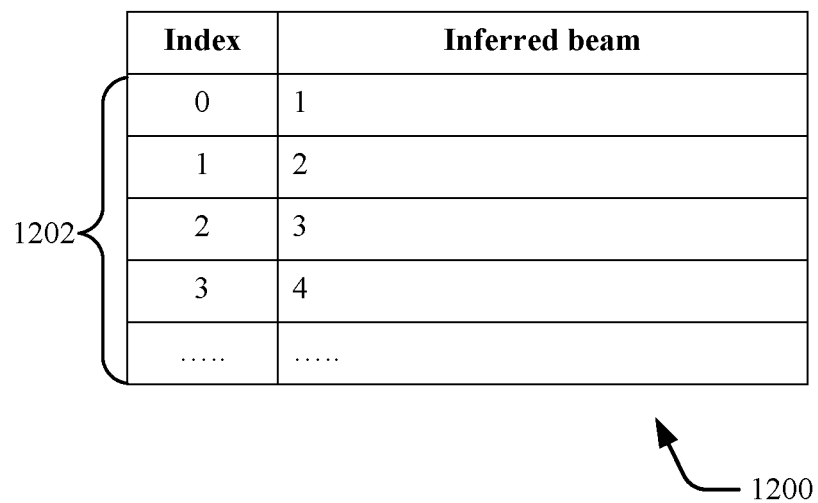

In at least one implementation a UE can be preconfigured with two beam association tables that indicate the relationship of identified beams with respect to another SSB beam. FIG. 11. illustrates a beam association table 1100 including beam records 1102 that each identify an inferred SSB beam with respect to a reference SSB beam, and FIG. 12 illustrates a beam association table 1200 including beam records 1202 that each identify a narrow beam within an SSB beam identified in the beam association table 1100. For example, where a UE communicates an index value pair of 0, 2, this identifies a beam $SSB_{ref}$-2 from the beam association table 1100, and a narrow beam 3 within $SSB_{ref}$-2 as indicated by the beam association table 1200. The described beam association tables are presented for purpose of example and do to preclude other techniques for identifying SSB beam(s) and/or narrower beam(s) can be indicated, such as other SSB beam(s) and/or narrower beam(s) that are inferred as suitable beams with higher RSRP, RSRQ, and/or SINR than an $SSB_{ref}$.

Figure 13:
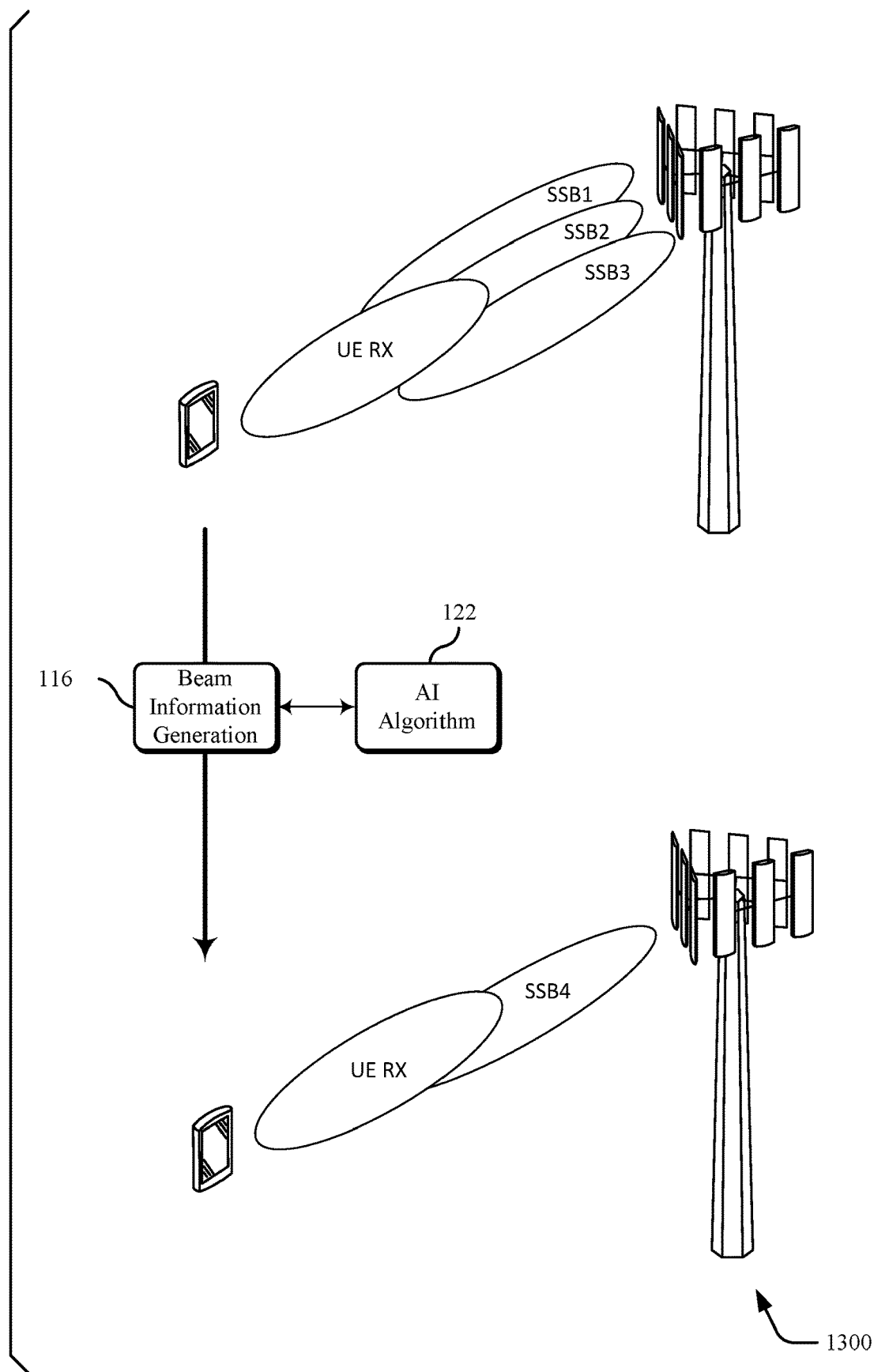
FIGS. 13-15 illustrate different example systems that support AI enabled beam management in accordance with aspects of the present disclosure.

FIG. 13 illustrates an example system 1300 that supports AI enabled beam management in accordance with aspects of the present disclosure. The system 1300 may implement or be implemented by aspects of the wireless communications system 100. The system 1300 depicts broad operation of the described techniques for purpose of illustration, but it is to be appreciated that the various details pertaining to AI beam management for wireless communication described herein can be employed in the context of the system 1300. In the system 1300 a UE 104 receives three SSB beams SSB1, SSB2, and SSB3 from a base station 102 via a UE receive beam ("UE RX), measures the received SSB beams, and performs beam information generation 118 on the measured SSB beams to infer an SSB beam SSB4. The UE 104, for instance, processes measurements of the SSB beams SSB1, SSB2, and SSB3 using the AI algorithm 122 to infer the beam SSB4. For example, the SSB beam SSB4 was not measured or processed as part of the beam information generation 118, but was inferred as output from the AI algorithm 122 as part of the beam information generation 118. In at least one implementation the UE 104 identifies the SSB4 beam to the base station 102 and wireless communication is established between the base station 102 and the UE 104 via the SSB4 beam.

Figure 14:
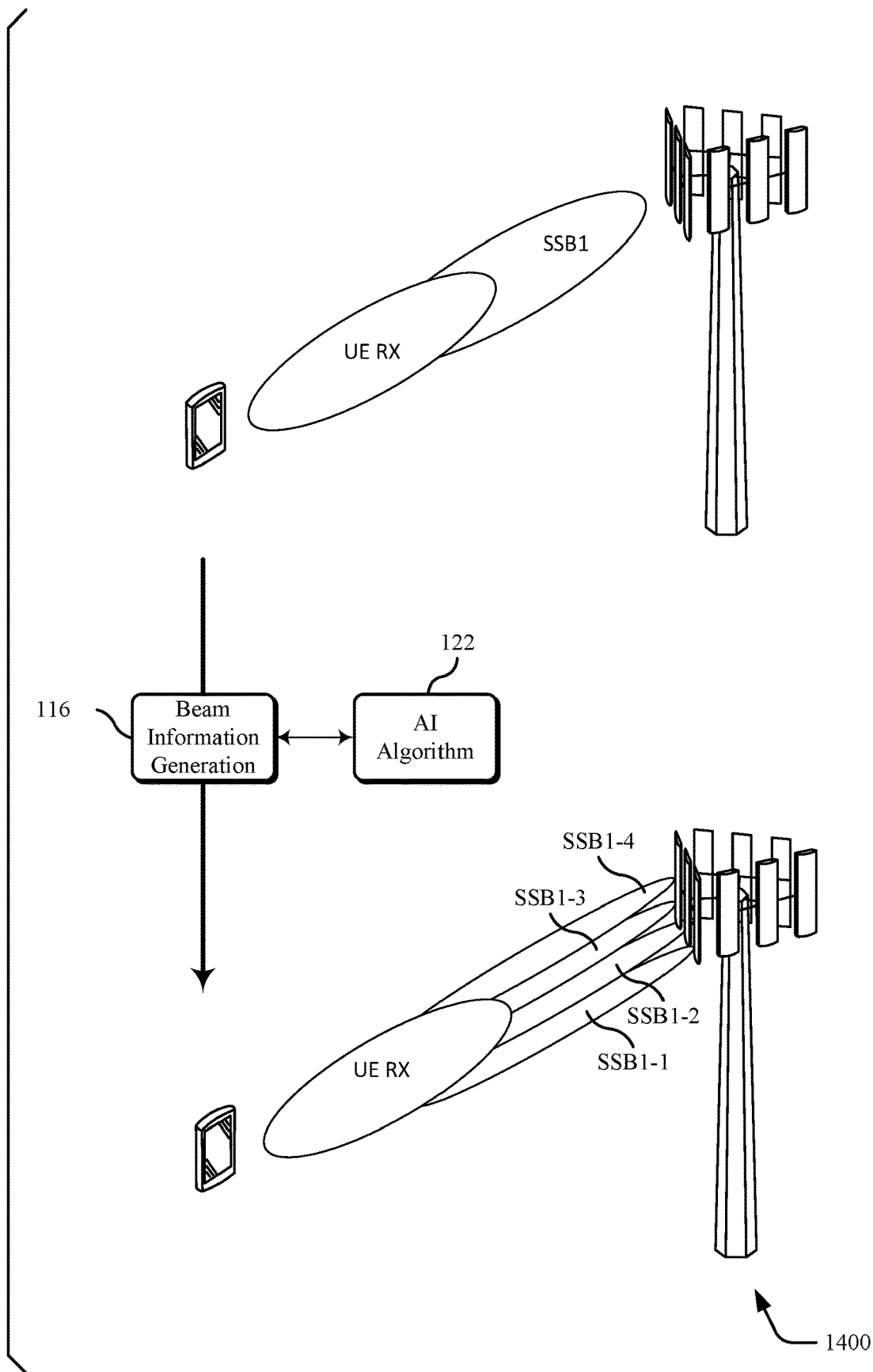

FIG. 14 illustrates an example system 1400 that supports AI enabled beam management in accordance with aspects of the present disclosure. The system 1400 may implement or be implemented by aspects of the wireless communications system 100. The system 1400 depicts broad operation of the described techniques for purpose of illustration, but it is to be appreciated that the various details pertaining to AI beam management for wireless communication described herein can be employed in the context of the system 1400. In the system 1400 a UE 104 receives an SSB beam SSB1 via the UE RX beam, measures SSB1, and performs beam information generation 118 on the measured SSB1 to infer multiple narrower beams SSB1-1, SSB1-2, SSB1-3, and SSB1-4 from within SSB1. The UE 104, for instance, processes measurements of SSB-1 using the AI algorithm 122 to infer the narrower beams SSB1-1, SSB1-2, SSB1-3, and SSB1-4. In at least one implementation, as part of inferring the narrower beams, output from the AI algorithm 122 indicates that SSB1-4 is identified as having measurements indicating that SSB1-4 is a best candidate from among the narrower beams, e.g., has a highest inferred signal quality and/or signal strength. Thus, UE 102 identifies the SSB1-4 beam to the base station 102 and wireless communication is established between the base station 102 and the UE 104 via the SSB1-4 beam.

Figure 15:
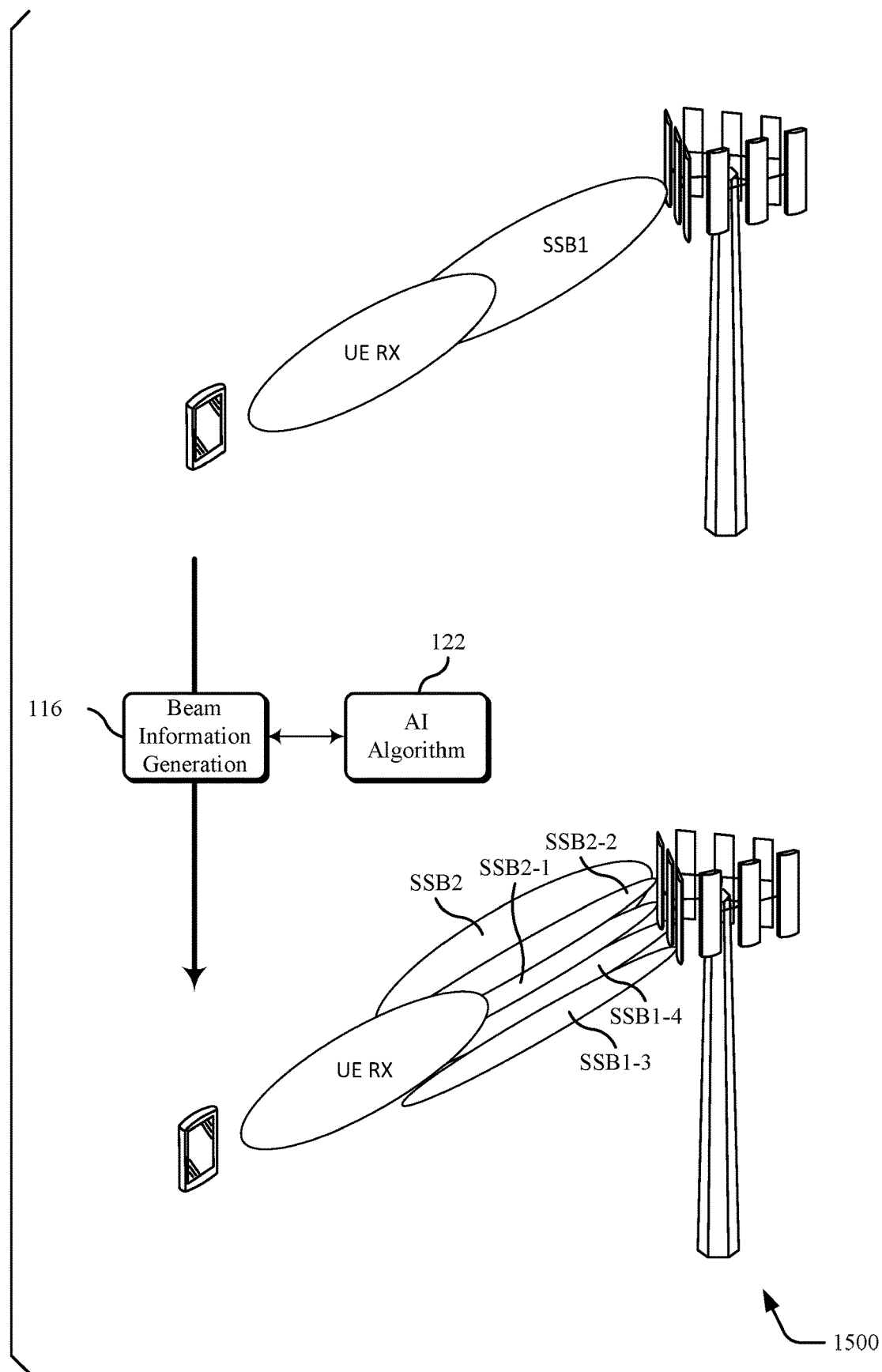

FIG. 15 illustrates an example system 1500 that supports AI enabled beam management in accordance with aspects of the present disclosure. The system 1500 may implement or be implemented by aspects of the wireless communications system 100. The system 1500 depicts broad operation of the described techniques for purpose of illustration, but it is to be appreciated that the various details pertaining to AI beam management for wireless communication described herein can be employed in the context of the system 1500. In the system 1500 a UE 104 receives an SSB beam SSB1 via the UE RX beam, measures beam SSB1, and performs beam information generation 118 on the measured SSB1 beam to infer two narrower beams SSB1-3 and SSB1-4 from with the SSB1 beam, and two narrow beams SSB2-1 and SSB2-2 from within and adjacent SSB beam SSB2. The UE 104, for instance, processes measurements of SSB-1 using the AI algorithm 122 to infer the narrower beams SSB1-3, SSB1-4, SSB2-1, and SSB2-2. Thus, the described techniques are operable to infer narrow beams from a reference SSB as well as adjacent SSB beams that are not directly detected by the UE. In at least one implementation, as part of inferring the narrower beams, output from the AI algorithm 122 indicates that SSB2-1 is identified as having measurements indicating that SSB2-1 is a best candidate from among the narrower beams, e.g., has a highest inferred signal quality and/or signal strength. Thus, UE 102 identifies the SSB2-1 beam to the base station 102 and wireless communication is established between the base station 102 and the UE 104 via the SSB2-1 beam.

Figure 16:
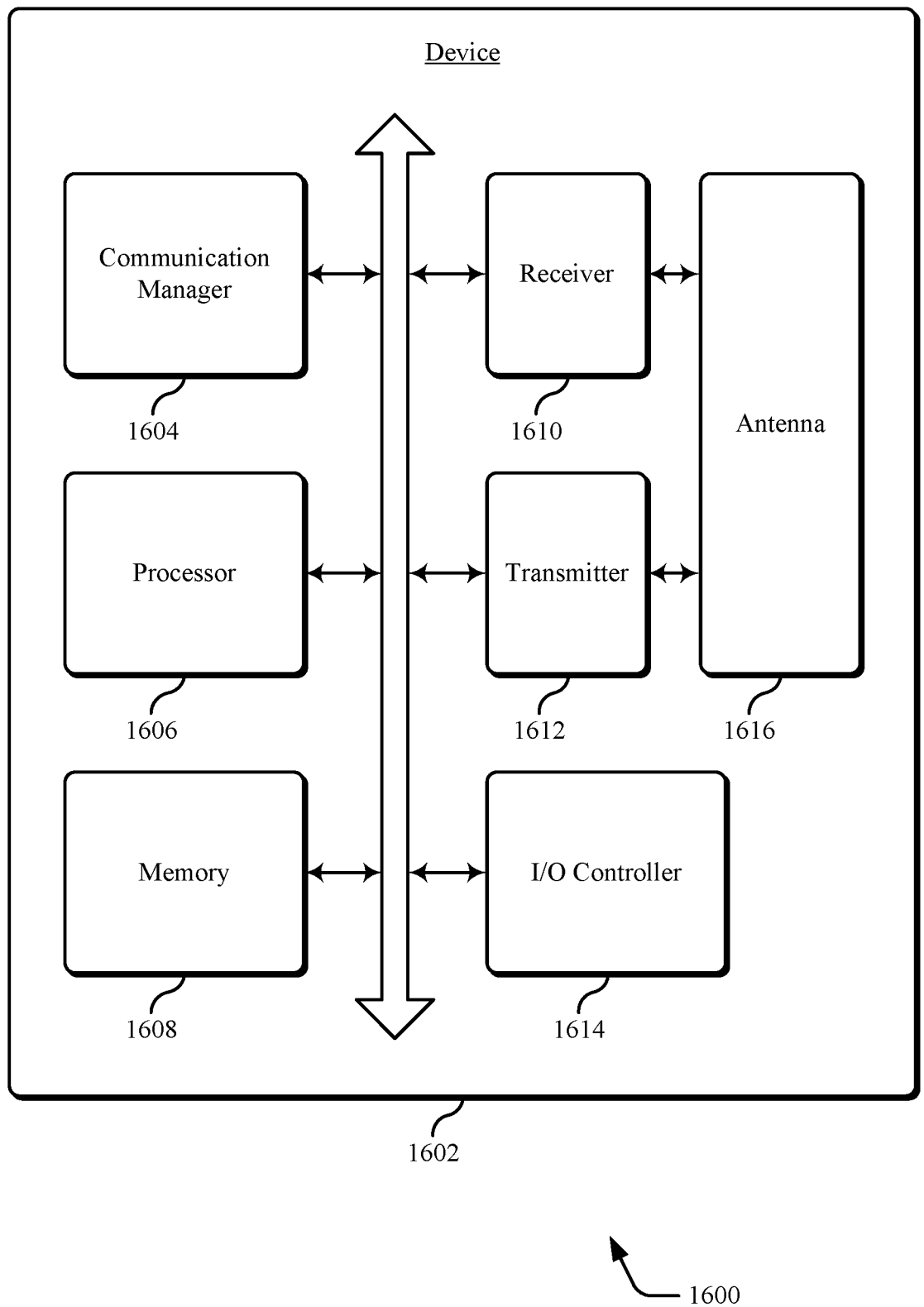
FIG. 16 illustrates an example of a block diagram 1600 of a device 1602 that supports AI enabled beam management in accordance with aspects of the present disclosure.

FIG. 16 illustrates an example of a block diagram 1600 of a device 1602 that supports AI enabled beam management in accordance with aspects of the present disclosure. The device 1602 may be an example of a UE 104 as described herein. The device 1602 may support wireless communication with one or more base stations 102, UEs 104, or any combination thereof. The device 1602 may include components for bi-directional communications including components for transmitting and receiving communications, such as a communication manager 1604, a processor 1606, a memory 1608, a receiver 1610, a transmitter 1612, and an I/O controller 1614. These components may be in electronic communication or otherwise coupled (e.g., operatively, communicatively, functionally, electronically, electrically) via one or more interfaces (e.g., buses).

The communication manager 1604, the receiver 1610, the transmitter 1612, or various combinations thereof or various components thereof may be examples of means for performing various aspects of the present disclosure as described herein. For example, the communication manager 1604, the receiver 1610, the transmitter 1612, or various combinations or components thereof may support a method for performing one or more of the functions described herein.

In some implementations, the communication manager 1604, the receiver 1610, the transmitter 1612, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some implementations, the processor 1606 and the memory 1608 coupled with the processor 1606 may be configured to perform one or more of the functions described herein (e.g., by executing, by the processor 1606, instructions stored in the memory 1608).

Additionally or alternatively, in some implementations, the communication manager 1604, the receiver 1610, the transmitter 1612, or various combinations or components thereof may be implemented in code (e.g., as communications management software or firmware) executed by the processor 1606. If implemented in code executed by the processor 1606, the functions of the communication manager 1604, the receiver 1610, the transmitter 1612, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some implementations, the communication manager 1604 may be configured to perform various operations (e.g., receiving, monitoring, transmitting) using or otherwise in cooperation with the receiver 1610, the transmitter 1612, or both. For example, the communication manager 1604 may receive information from the receiver 1610, send information to the transmitter 1612, or be integrated in combination with the receiver 1610, the transmitter 1612, or both to receive information, transmit information, or perform various other operations as described herein. Although the communication manager 1604 is illustrated as a separate component, in some implementations, one or more functions described with reference to the communication manager 1604 may be supported by or performed by the processor 1606, the memory 1608, or any combination thereof. For example, the memory 1608 may store code, which may include instructions executable by the processor 1606 to cause the device 1602 to perform various aspects of the present disclosure as described herein, or the processor 1606 and the memory 1608 may be otherwise configured to perform or support such operations.

In some implementations, the communication manager 1604 represents and/or implements a dedicated AI module that is configured to apply at least in part the various AI-enabled beam management features discussed herein. For instance, to support various AI-enabled beam management features (e.g., algorithms, procedures, signaling, etc.) the communication manager 1604 can be trained or is already trained to accept a set of input parameters and based on the inputs and its trained/learned algorithms provide output for one or more wireless-related procedures, algorithms, signals, and so forth. For instance, AI-enabled beam management features implemented by the communication manager 1604 are able to provide output (e.g., via inference) with more highly optimized performance in comparison to a node (e.g., a UE) that does not support AI-enabled beam management features. Such performance enabled by supported AI-enabled beam management features can be improved in terms of accuracy, latency, overhead, complexity, or combinations thereof. Further, supported AI-enabled beam management features can be applied at the transmitter 1612, at the receiver 1610, and/or a combination thereof. In some implementations a supported AI-enabled beam management feature, unless otherwise indicated, is applicable to both the transmitter chain as well a receiver chain of the device 1602.

For example, the communication manager 1604 may support wireless communication at a first device (e.g., the device 1602) in accordance with examples as disclosed herein. The communication manager 1604 and/or other device components may be configured as or otherwise support a means for wireless communication at a device, including receiving a set of signals over a first set of beams; performing beam measurement on each beam of the first set of beams based at least in part on the received set of signals over the first set of beams; generating beam information for a second set of beams based at least in part on the performed beam measurements on the first set of beams, the beam information including a respective beam identifier for each beam of the second set of beams and beam measurements for the second set beams; and communicating, to a second device, beam information for at least one beam of the second set of beams for configuring the wireless communication between the device and the second device.

Additionally, wireless communication at the device includes any one or combination of: generating the beam information for the second set of beams independent of receiving or measuring the second beams; where generating the beam information for the second set of beams includes inputting the beam measurements of at least one beam from the first set of beams into an AI algorithm, and receiving the beam information for the second set of beams as output from the AI algorithm; where the device is a user equipment and the second device is a network element, and where the AI algorithm is implemented on the user equipment; receiving algorithm configuration information from the second device including one or more of input configuration information or output configuration information; and configuring operation of the AI algorithm with the algorithm configuration information; where the algorithm configuration information is received from the second device via one or more of a master information block, a system information block, or a combination thereof; where the algorithm configuration information includes the input configuration information, and the input configuration information includes input parameters for input to the AI algorithm including one or more of: a minimum number of beams to be included in the first set of one or more beams; a minimum value for one or more of reference signal received power, received signal strength indicator, reference signal received quality, or signal-to-noise and interference ratio for individual beams of the first set of beams; a minimum gap between individual beams of the first set of beams; a maximum gap between individual beams of the first set of beams; a fixed gap between individual beams of the first set of beams; or a maximum allowed latency to infer the beam information for the second set of beams using the AI algorithm;

Additionally, wireless communication at the device includes any one or combination of: where the algorithm configuration information includes the output configuration information, and the output configuration information includes output parameters for output from the AI algorithm including one or more of: a number of beams to be included in the second set of beams; a number of beams that are narrower than the first set of beams to be included in the second set of beams; or a minimum accuracy of the beam information for the second set of beams; where the first set of beams include one or more first synchronization signal block beams, and the second set of beams include: one or more second synchronization signal block beams, one or more beams from within the one or more first synchronization signal block beams that are narrower than the one or more first synchronization signal block beams, or a combination thereof; communicating the beam information as part of a random access channel procedure; communicating the beam information as part of a random access channel procedure via Msg1, Msg3, or a combination thereof; where the beam information includes an index value for a table that provides association information for associating the at least one beam of the second set of beams with the first set beams.

Additionally, a device for wireless communication includes a communication manager configured to: receive a set of signals over a first set of beams; perform beam measurement on each beam of the first set of beams based at least in part on the received set of signals over the first set of beams; and generate beam information for a second set of beams based at least in part on the performed beam measurements on the first set of beams, the beam information including a respective beam identifier for each beam of the second set of beams and beam measurements for the second set beams; and a transceiver configured to communicate, to a second device, beam information for at least one beam of the second set of beams for configuring the wireless communication between the device and the second device.

Additionally, the device for wireless communication includes any one or combination of: to generate the beam information for the second set of beams independent of receiving or measuring the second beams; where to generate the beam information for the second set of beams includes to input the beam measurements of at least one beam from the first set of beams into an AI algorithm, and to receive the beam information for the second set of beams as output from the AI algorithm; where the device is a user equipment and the second device is a network element, and where the AI algorithm is implemented on the user equipment; where the communication manager is further configured to: receive algorithm configuration information from the second device including one or more of input configuration information or output configuration information; and configure operation of the AI algorithm with the algorithm configuration information; where the algorithm configuration information is received from the second device via one or more of a master information block, a system information block, or a combination thereof; where the algorithm configuration information includes the input configuration information, and the input configuration information includes input parameters for input to the AI algorithm including one or more of: a minimum number of beams to be included in the first set of one or more beams; a minimum value for one or more of reference signal received power, received signal strength indicator, reference signal received quality, or signal-to-noise and interference ratio for individual beams of the first set of beams; a minimum gap between individual beams of the first set of beams; a maximum gap between individual beams of the first set of beams; a fixed gap between individual beams of the first set of beams; or a maximum allowed latency to infer the beam information for the second set of beams using the AI algorithm;

Additionally, the device for wireless communication includes any one or combination of: where the algorithm configuration information includes the output configuration information, and the output configuration information includes output parameters for output from the AI algorithm including one or more of: a number of beams to be included in the second set of beams; a number of beams that are narrower than the first set of beams to be included in the second set of beams; or a minimum accuracy of the beam information for the second set of beams; where the first set of beams include one or more first synchronization signal block beams, and the second set of beams include: one or more second synchronization signal block beams, one or more beams from within the one or more first synchronization signal block beams that are narrower than the one or more first synchronization signal block beams, or a combination thereof, where the transceiver is configured to communicate the beam information as part of a random access channel procedure; where the transceiver is configured to communicate the beam information as part of a random access channel procedure via Msg1, Msg3, or a combination thereof; where the beam information includes an index value for a table that provides association information for associating the at least one beam of the second set of beams with the first set beams. In some instances, in response to the beam information received from a UE, a wireless network may indicate a different beam than those used for SSB reception to the UE. For instance, the wireless network may identify a different beam for further transmission and/or reception such as by indicating a different beam via Msg2 for updating the beam for Msg3 transmission and/or Msg4 reception. Further, a similar procedure can be applied for a 2-step RACH procedure as well.

The processor 1606 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some implementations, the processor 1606 may be configured to operate a memory array using a memory controller. In some other implementations, a memory controller may be integrated into the processor 1606. The processor 1606 may be configured to execute computer-readable instructions stored in a memory (e.g., the memory 1608) to cause the device 1602 to perform various functions of the present disclosure.

The memory 1608 may include random access memory (RAM) and read-only memory (ROM). The memory 1608 may store computer-readable, computer-executable code including instructions that, when executed by the processor 1606 cause the device 1602 to perform various functions described herein. The code may be stored in a non-transitory computer-readable medium such as system memory or another type of memory. In some implementations, the code may not be directly executable by the processor 1606 but may cause a computer (e.g., when compiled and executed) to perform functions described herein. In some implementations, the memory 1608 may include, among other things, a basic I/O system (BIOS) which may control basic hardware or software operation such as the interaction with peripheral components or devices.

The I/O controller 1614 may manage input and output signals for the device 1602. The I/O controller 1614 may also manage peripherals not integrated into the device 1602. In some implementations, the I/O controller 1614 may represent a physical connection or port to an external peripheral. In some implementations, the I/O controller 1614 may utilize an operating system such as iOS®, ANDROID®, MS-DOS®, MS-WINDOWS®, OS/2®, UNIX®, LINUX®, or another known operating system. In some implementations, the I/O controller 1614 may be implemented as part of a processor, such as the processor 1606. In some implementations, a user may interact with the device 1602 via the I/O controller 1614 or via hardware components controlled by the I/O controller 1614.

In some implementations, the device 1602 may include a single antenna 1616. However, in some other implementations, the device 1602 may have more than one antenna 1616, which may be capable of concurrently transmitting or receiving multiple wireless transmissions. The receiver 1610 and the transmitter 1612 may communicate bi-directionally, via the one or more antennas 1616, wired, or wireless links as described herein. For example, the receiver 1610 and the transmitter 1612 may represent a wireless transceiver and may communicate bi-directionally with another wireless transceiver. The transceiver may also include a modem to modulate the packets, to provide the modulated packets to one or more antennas 1616 for transmission, and to demodulate packets received from the one or more antennas 1616.

Figure 17:
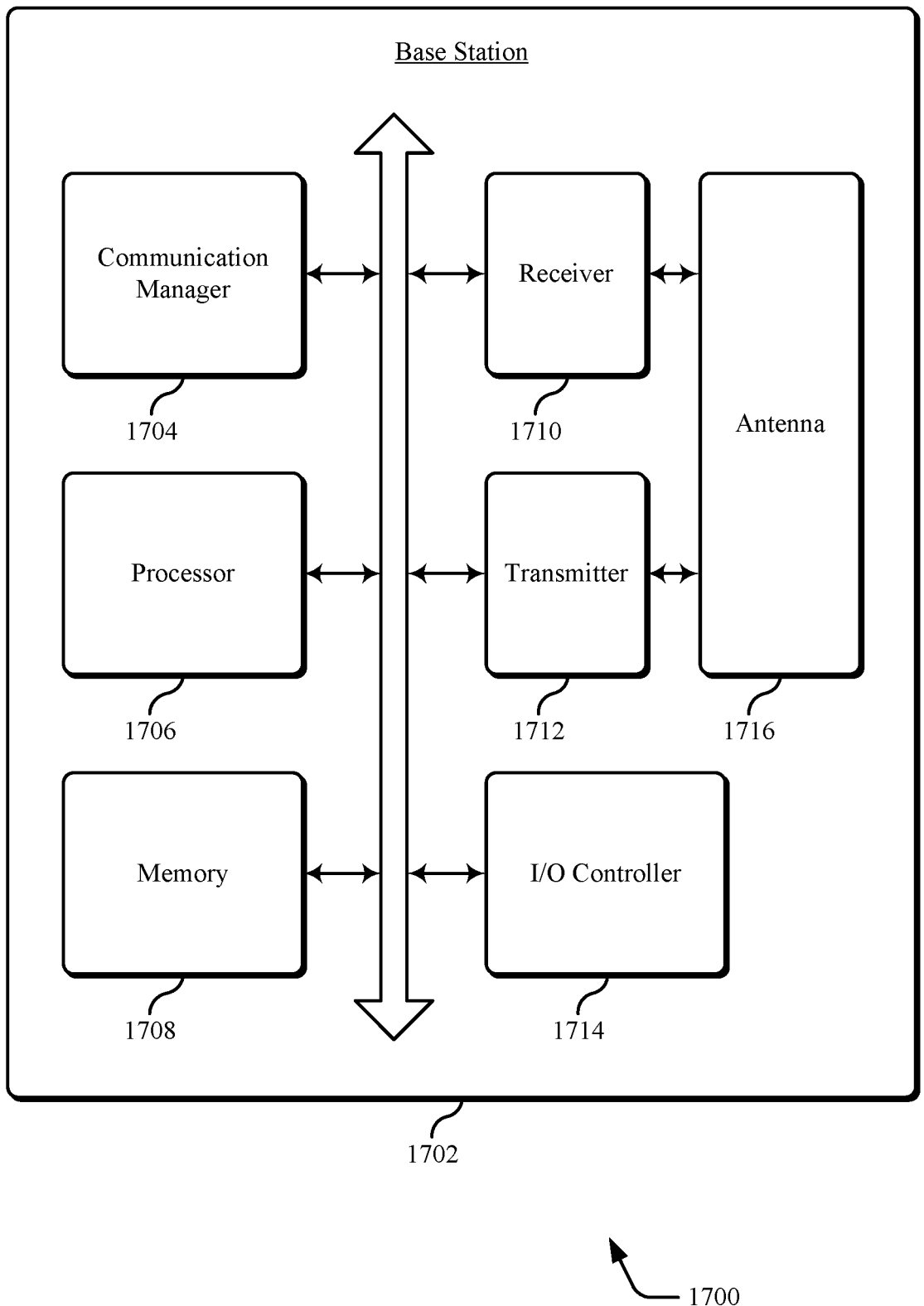
FIG. 17 illustrates an example of a block diagram 1700 of a device 1702 that supports AI enabled beam management in accordance with aspects of the present disclosure.

FIG. 17 illustrates an example of a block diagram 1700 of a device 1702 that supports AI enabled beam management in accordance with aspects of the present disclosure. The device 1702 may be an example of a base station 102, such as a gNB as described herein. The device 1702 may support wireless communication with one or more base stations 102, UEs 104, or any combination thereof. The device 1702 may include components for bi-directional communications including components for transmitting and receiving communications, such as a communications manager 1704, a processor 1706, a memory 1708, a receiver 1710, a transmitter 1712, and an I/O controller 1714. These components may be in electronic communication or otherwise coupled (e.g., operatively, communicatively, functionally, electronically, electrically) via one or more interfaces (e.g., buses).

The communications manager 1704, the receiver 1710, the transmitter 1712, or various combinations thereof or various components thereof may be examples of means for performing various aspects of the present disclosure as described herein. For example, the communications manager 1704, the receiver 1710, the transmitter 1712, or various combinations or components thereof may support a method for performing one or more of the functions described herein.

In some implementations, the communications manager 1704, the receiver 1710, the transmitter 1712, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some implementations, the processor 1706 and the memory 1708 coupled with the processor 1706 may be configured to perform one or more of the functions described herein (e.g., by executing, by the processor 1706, instructions stored in the memory 1708).

Additionally or alternatively, in some implementations, the communications manager 1704, the receiver 1710, the transmitter 1712, or various combinations or components thereof may be implemented in code (e.g., as communications management software or firmware) executed by the processor 1706. If implemented in code executed by the processor 1706, the functions of the communications manager 1704, the receiver 1710, the transmitter 1712, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some implementations, the communications manager 1704 may be configured to perform various operations (e.g., receiving, monitoring, transmitting) using or otherwise in cooperation with the receiver 1710, the transmitter 1712, or both. For example, the communications manager 1704 may receive information from the receiver 1710, send information to the transmitter 1712, or be integrated in combination with the receiver 1710, the transmitter 1712, or both to receive information, transmit information, or perform various other operations as described herein. Although the communications manager 1704 is illustrated as a separate component, in some implementations, one or more functions described with reference to the communications manager 1704 may be supported by or performed by the processor 1706, the memory 1708, or any combination thereof. For example, the memory 1708 may store code, which may include instructions executable by the processor 1706 to cause the device 1702 to perform various aspects of the present disclosure as described herein, or the processor 1706 and the memory 1708 may be otherwise configured to perform or support such operations.

In some implementations, the communication manager 1704 represents and/or implements a dedicated AI module that is configured to apply at least in part the various AI-enabled beam management features discussed herein. For instance, to support various AI-enabled beam management features (e.g., algorithms, procedures, signaling, etc.) the communication manager 1704 can be trained or is already trained to accept a set of input parameters and based on the inputs and its trained/learned algorithms provide output for one or more wireless-related procedures, algorithms, signals, and so forth. For instance, AI-enabled beam management features implemented by the communication manager 1704 are able to provide output (e.g., via inference) with more highly optimized performance in comparison to a node (e.g., a base station) that does not support AI features. Such performance enabled by supported AI-enabled beam management features can be improved in terms of accuracy, latency, overhead, complexity, or combinations thereof. Further, supported AI-enabled beam management features can be applied at the transmitter 1712, at the receiver 1710, and/or a combination thereof. In some implementations a supported AI-enabled beam management feature, unless otherwise indicated, is applicable to both the transmitter chain as well a receiver chain of the device 1702.

For example, the communications manager 1704 may support wireless communication at a first device (e.g., the base station as device 1702) in accordance with examples as disclosed herein. The communications manager 1704 and/or other device components may be configured as or otherwise support a means for wireless communication at a base station, including generating, at a device, one or more notifications that include an indication for a second device to apply AI beam management, and algorithm configuration information including one or more of input configuration information or output configuration information for configuring operation of an AI algorithm at the second device to generate beam information; and communicating the one or more notifications for receipt by the second device for configuring wireless communication between the device and the second device.

Additionally, wireless communication at the base station includes any one or combination of: where generating the one or more notifications includes generating the one or more notifications as one or more of a master information block, a system information block, or a combination thereof, where the one or more notifications include an index value for a table at the second node that specifies one or more of the input configuration information or the output configuration information; where the input configuration information includes a first index value for a first table at the second node that specifies input parameters for input to the AI algorithm, and the output configuration information includes a second index value for a second table at the second node that specifies output parameters for output from the AI algorithm;

Additionally, wireless communication at the base station includes any one or combination of: where the one or more notifications include the input configuration information and the input configuration information specifies input parameters for input information to be input into the AI algorithm, the input parameters including one or more of: a minimum number of beams to be described in input into the AI algorithm; a minimum value for one or more of reference signal received power, received signal strength indicator, reference signal received quality, or signal-to-noise and interference ratio for individual beams to be described in input into the AI algorithm; a minimum gap between individual beams to be described in input into the AI algorithm; a maximum gap between individual beams to be described in input into the AI algorithm; a fixed gap between individual beams to be described in input into the AI algorithm; or a maximum allowed latency to infer beam information for beams using the AI algorithm; where the one or more notifications include the output configuration information and the output configuration information specifies output parameters for output information from the AI algorithm, the output parameters including one or more of: a number of beams to be identified in output from the AI algorithm; a number of output beams that are narrower than one or more input beams that are to be identified in output from the AI algorithm; or a minimum accuracy of beam information for one or more beams identified in output from the AI algorithm.

Additionally, a base station for wireless communication includes a communications manager configured to generate, at the device, one or more notifications that include an indication for a second device to apply AI beam management, and algorithm configuration information including one or more of input configuration information or output configuration information for configuring operation of an AI algorithm at the second device to generate beam information; and a transceiver configured to communicate the one or more notifications for receipt by the second device for configuring wireless communication between the device and the second device.

Additionally, the base station for wireless communication includes any one or combination of: where to generate the one or more notifications includes to generate the one or more notifications as one or more of a master information block, a system information block, or a combination thereof, where the one or more notifications include an index value for a table at the second node that specifies one or more of the input configuration information or the output configuration information; where the input configuration information includes a first index value for a first table at the second node that specifies input parameters for input to the AI algorithm, and the output configuration information includes a second index value for a second table at the second node that specifies output parameters for output from the AI algorithm;

Additionally, the base station for wireless communication includes any one or combination of: where the one or more notifications include the input configuration information and the input configuration information specifies input parameters for input information to be input into the AI algorithm, the input parameters including one or more of: a minimum number of beams to be described in input into the AI algorithm; a minimum value for one or more of reference signal received power, received signal strength indicator, reference signal received quality, or signal-to-noise and interference ratio for individual beams to be described in input into the AI algorithm; a minimum gap between individual beams to be described in input into the AI algorithm; a maximum gap between individual beams to be described in input into the AI algorithm; a fixed gap between individual beams to be described in input into the AI algorithm; or a maximum allowed latency to infer beam information for beams using the AI algorithm; where the one or more notifications include the output configuration information and the output configuration information specifies output parameters for output information from the AI algorithm, the output parameters including one or more of: a number of beams to be identified in output from the AI algorithm; a number of output beams that are narrower than one or more input beams that are to be identified in output from the AI algorithm; or a minimum accuracy of beam information for one or more beams identified in output from the AI algorithm.

The processor 1706 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some implementations, the processor 1706 may be configured to operate a memory array using a memory controller. In some other implementations, a memory controller may be integrated into the processor 1706. The processor 1706 may be configured to execute computer-readable instructions stored in a memory (e.g., the memory 1708) to cause the device 1702 to perform various functions of the present disclosure.

The memory 1708 may include random access memory (RAM) and read-only memory (ROM). The memory 1708 may store computer-readable, computer-executable code including instructions that, when executed by the processor 1706 cause the device 1702 to perform various functions described herein. The code may be stored in a non-transitory computer-readable medium such as system memory or another type of memory. In some implementations, the code may not be directly executable by the processor 1706 but may cause a computer (e.g., when compiled and executed) to perform functions described herein. In some implementations, the memory 1708 may include, among other things, a basic I/O system (BIOS) which may control basic hardware or software operation such as the interaction with peripheral components or devices.

The I/O controller 1714 may manage input and output signals for the device 1702. The I/O controller 1714 may also manage peripherals not integrated into the device 1702. In some implementations, the I/O controller 1714 may represent a physical connection or port to an external peripheral. In some implementations, the I/O controller 1714 may utilize an operating system such as iOS®, ANDROID®, MS-DOS®, MS-WINDOWS®, OS/2®, UNIX®, LINUX®, or another known operating system. In some implementations, the I/O controller 1714 may be implemented as part of a processor, such as the processor 1706. In some implementations, a user may interact with the device 1702 via the I/O controller 1714 or via hardware components controlled by the I/O controller 1714.

In some implementations, the device 1702 may include a single antenna 1716. However, in some other implementations, the device 1702 may have more than one antenna 1716, which may be capable of concurrently transmitting or receiving multiple wireless transmissions. The receiver 1710 and the transmitter 1712 may communicate bi-directionally, via the one or more antennas 1716, wired, or wireless links as described herein. For example, the receiver 1710 and the transmitter 1712 may represent a wireless transceiver and may communicate bi-directionally with another wireless transceiver. The transceiver may also include a modem to modulate the packets, to provide the modulated packets to one or more antennas 1716 for transmission, and to demodulate packets received from the one or more antennas 1716.

Figure 18:
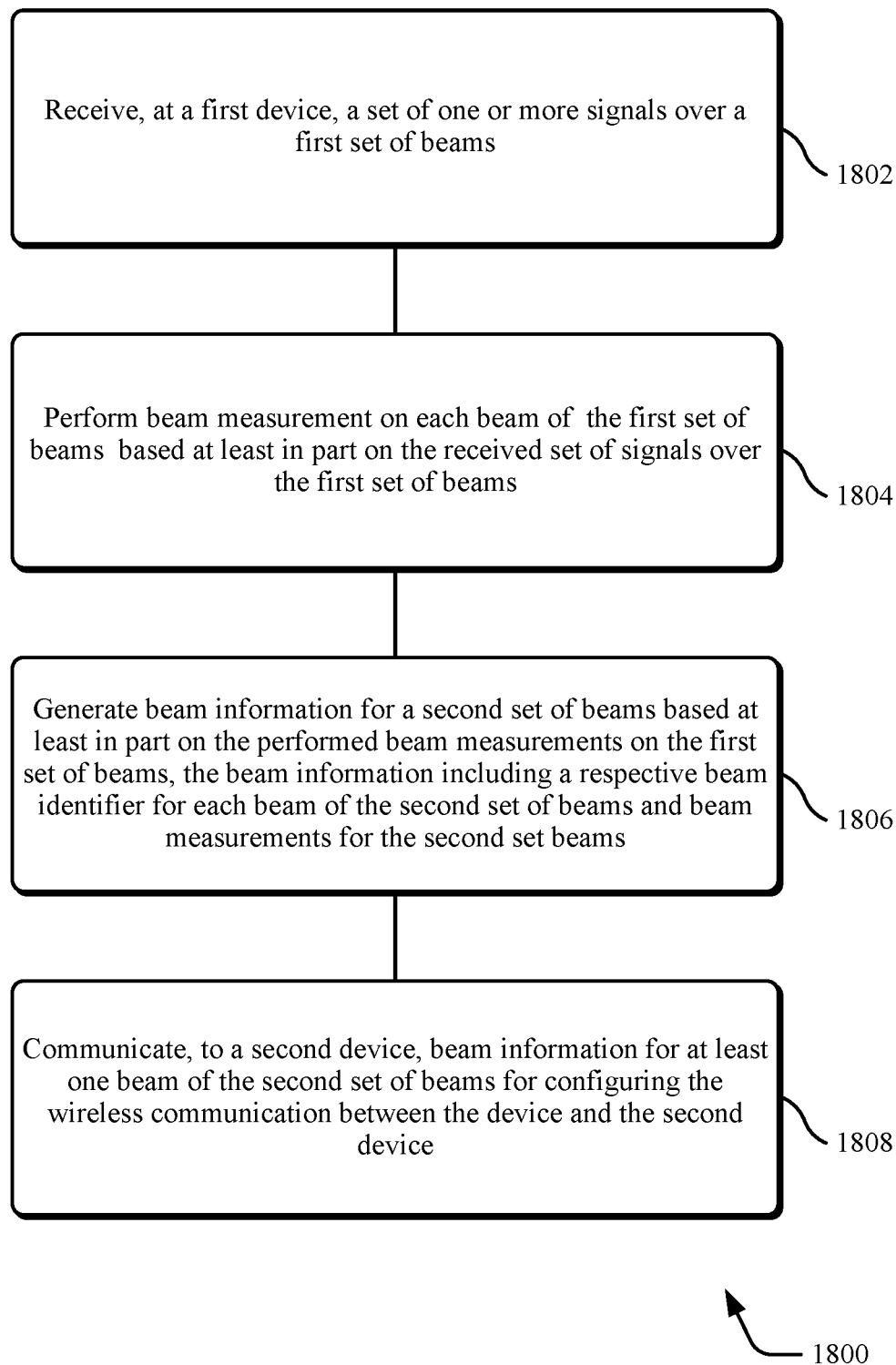
FIGS. 18-21 illustrate flowcharts of methods that support AI enabled beam management in accordance with aspects of the present disclosure.

FIG. 18 illustrates a flowchart of a method 1800 that supports AI enabled beam management in accordance with aspects of the present disclosure. The operations of the method 1800 may be implemented by a device or its components as described herein. For example, the operations of the method 1800 may be performed by a device, such as a UE 104 as described with reference to FIGS. 1 through 17. In some implementations, the device may execute a set of instructions to control the function elements of the device to perform the described functions. Additionally, or alternatively, the device may perform aspects of the described functions using special-purpose hardware.

At 1802, the method may include receiving, at a first device, a set of one or more signals over a first set of beams. The operations of 1802 may be performed in accordance with examples as described herein. In some implementations, aspects of the operations of 1802 may be performed by a device as described with reference to FIG. 1.

At 1804, the method may include performing beam measurement on each beam of the first set of beams based at least in part on the received set of signals over the first set of beams. The operations of 1802 may be performed in accordance with examples as described herein. In some implementations, aspects of the operations of 1804 may be performed by a device as described with reference to FIG. 1.

At 1806, the method may include generating beam information for a second set of beams based at least in part on the performed beam measurements on the first set of beams, the beam information including a respective beam identifier for each beam of the second set of beams and beam measurements for the second set beams. The operations of 1806 may be performed in accordance with examples as described herein. In some implementations, aspects of the operations of 1806 may be performed by a device as described with reference to FIG. 1.

At 1808, the method may include communicating, to a second device, beam information for at least one beam of the second set of beams for configuring the wireless communication between the device and the second device. The operations of 1808 may be performed in accordance with examples as described herein. In some implementations, aspects of the operations of 1808 may be performed by a device as described with reference to FIG. 1.

Figure 19:
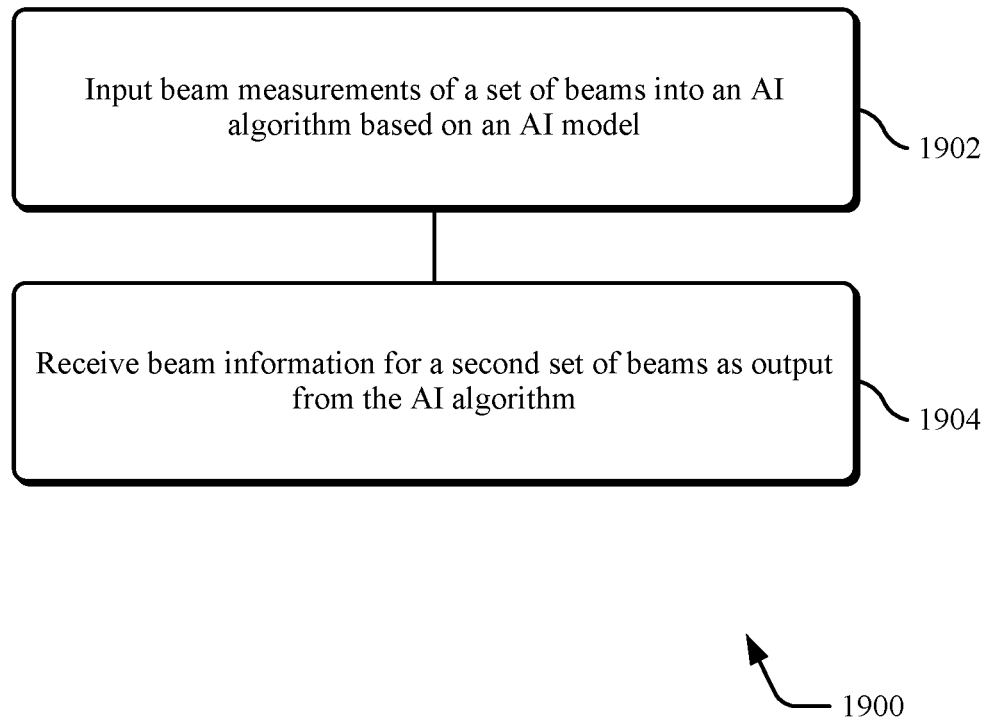

FIG. 19 illustrates a flowchart of a method 1900 that supports AI enabled beam management in accordance with aspects of the present disclosure. The operations of the method 1900 may be implemented by a device or its components as described herein. For example, the operations of the method 1900 may be performed by a device, such as a UE 104 as described with reference to FIGS. 1 through 17. In some implementations, the device may execute a set of instructions to control the function elements of the device to perform the described functions. Additionally, or alternatively, the device may perform aspects of the described functions using special-purpose hardware.

At 1902, the method may include inputting beam measurements of a set of beams into an AI algorithm based on an AI model. The operations of 1902 may be performed in accordance with examples as described herein. In some implementations, aspects of the operations of 1902 may be performed by a device as described with reference to FIG. 1.

At 1904, the method may include receiving beam information for a second set of beams as output from the AI algorithm. The operations of 1904 may be performed in accordance with examples as described herein. In some implementations, aspects of the operations of 1904 may be performed by a device as described with reference to FIG. 1.

Figure 20:
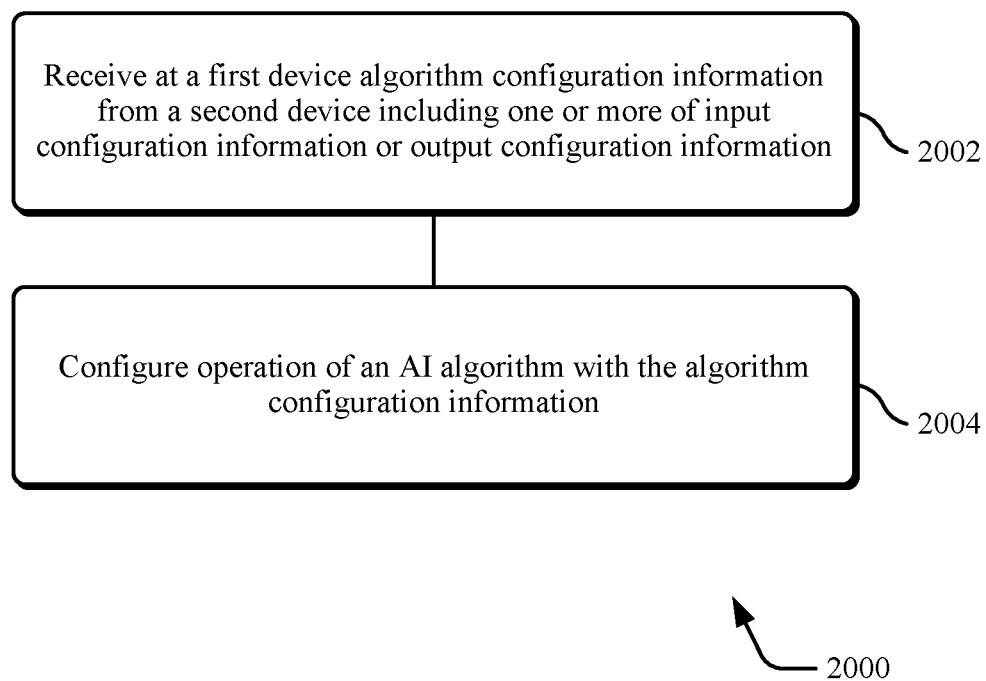

FIG. 20 illustrates a flowchart of a method 2000 that supports AI enabled beam management in accordance with aspects of the present disclosure. The operations of the method 2000 may be implemented by a device or its components as described herein. For example, the operations of the method 2000 may be performed by a device, such as a UE 104 as described with reference to FIGS. 1 through 17. In some implementations, the device may execute a set of instructions to control the function elements of the device to perform the described functions. Additionally, or alternatively, the device may perform aspects of the described functions using special-purpose hardware.

At 2002, the method may include receiving at a first device algorithm configuration information from a second device including one or more of input configuration information or output configuration information. The operations of 2002 may be performed in accordance with examples as described herein. In some implementations, aspects of the operations of 2002 may be performed by a device as described with reference to FIG. 1.

At 2004, the method may include configuring operation of an AI algorithm with the algorithm configuration information. The operations of 2004 may be performed in accordance with examples as described herein. In some implementations, aspects of the operations of 2004 may be performed by a device as described with reference to FIG. 1.

Figure 21:
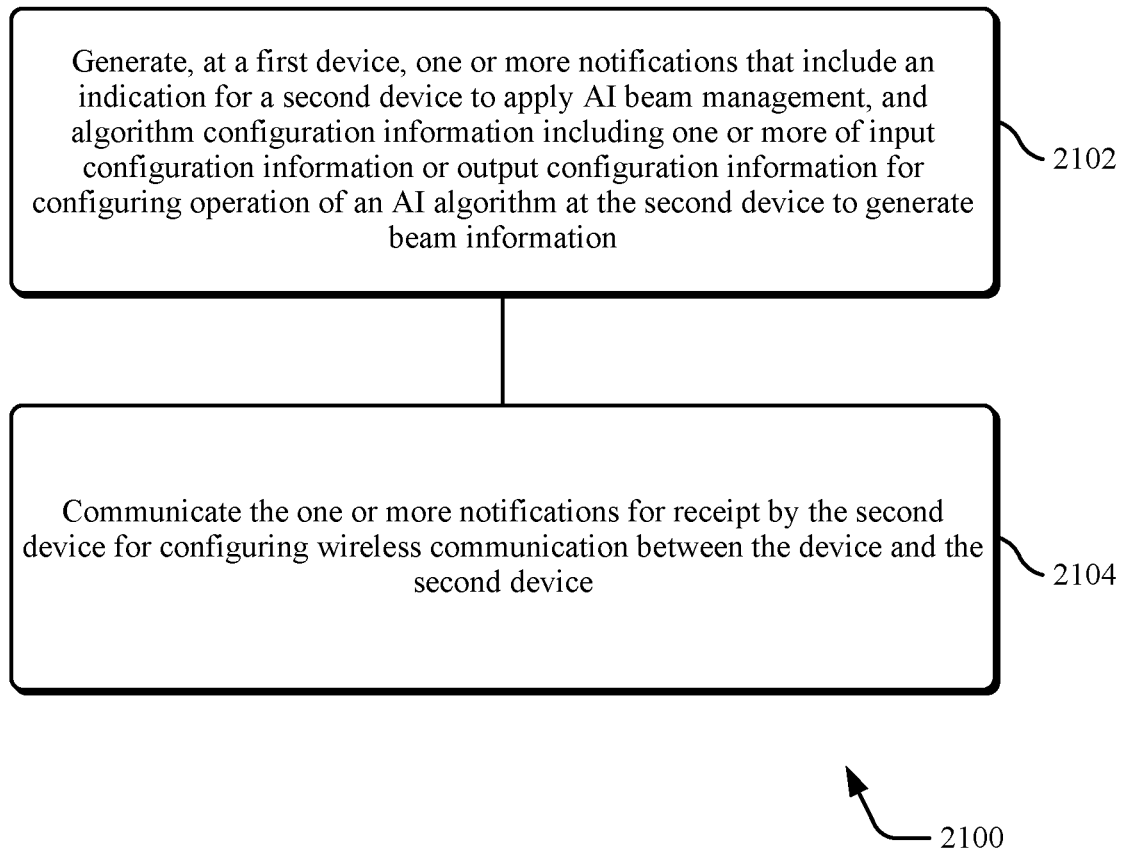

FIG. 21 illustrates a flowchart of a method 2100 that supports AI enabled beam management in accordance with aspects of the present disclosure. The operations of the method 2100 may be implemented by a device or its components as described herein. For example, the operations of the method 2100 may be performed by a device, such as a base station 102 as described with reference to FIGS. 1 through 17. In some implementations, the device may execute a set of instructions to control the function elements of the device to perform the described functions. Additionally, or alternatively, the device may perform aspects of the described functions using special-purpose hardware.

At 2102, the method may include generating, at a first device, one or more notifications that include an indication for a second device to apply AI beam management, and algorithm configuration information including one or more of input configuration information or output configuration information for configuring operation of an AI algorithm at the second device to generate beam information. The operations of 2102 may be performed in accordance with examples as described herein. In some implementations, aspects of the operations of 2102 may be performed by a device as described with reference to FIG. 1.

At 2104, the method may include communicating the one or more notifications for receipt by the second device for configuring wireless communication between the device and the second device. The operations of 2104 may be performed in accordance with examples as described herein. In some implementations, aspects of the operations of 2104 may be performed by a device as described with reference to FIG. 1.

It should be noted that the methods described herein describe possible implementations, and that the operations and the steps may be rearranged or otherwise modified and that other implementations are possible. Further, aspects from two or more of the methods may be combined. The order in which the methods are described is not intended to be construed as a limitation, and any number or combination of the described method operations can be performed in any order to perform a method, or an alternate method.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor.

Any connection may be properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on. Further, as used herein, including in the claims, a "set" may include one or more elements.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form to avoid obscuring the concepts of the described example.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE) for wireless communication, comprising:
at least one memory; and
at least one processor coupled with the at least one memory and configured to cause the UE to:
receive a set of signals over a first set of beams;
perform one or more beam measurements associated with the first set of beams based at least in part on the set of signals;
generate beam information associated with a second set of beams based at least in part on the one or more beam measurements associated with the first set of beams, wherein the beam information includes a respective beam identifier for each beam of the second set of beams and one or more beam measurements associated with the second set of beams, and wherein the first set of beams is non-overlapping with the second set of beams; and
transmit the beam information associated with the second set of beams, wherein the beam information is for configuring the wireless communication between the UE and a network equipment (NE).

2. The UE of claim 1, wherein the at least one processor is configured to generate the beam information associated with the second set of beams independent of receiving or measuring the second set of beams.

3. The UE of claim 1, wherein to generate the beam information associated with the second set of beams, the at least one processor is configured to cause the UE to:
input the one or more beam measurements associated with the first set of beams into an artificial intelligence algorithm; and
receive the beam information associated with the second set of beams as output from the artificial intelligence algorithm.

4. The UE of claim 3, wherein the artificial intelligence algorithm is implemented at the UE.

5. The UE of claim 3, wherein the at least one processor is configured to cause the UE to:
receive algorithm configuration information from the NE including one or more of input configuration information or output configuration information; and
configure operation of the artificial intelligence algorithm with the algorithm configuration information.

6. The UE of claim 5, wherein the algorithm configuration information is received from the NE via one or more of a master information block or a system information block.

7. The UE of claim 5, wherein the algorithm configuration information includes the input configuration information, and the input configuration information includes input parameters for input to the artificial intelligence algorithm comprising one or more of:
a minimum number of beams to be included in the first set of beams;
a minimum value for one or more of reference signal received power, received signal strength indicator, reference signal received quality, or signal-to-interference plus noise ratio for individual beams of the first set of beams;
a minimum gap between the individual beams of the first set of beams;
a maximum gap between the individual beams of the first set of beams;
a fixed gap between the individual beams of the first set of beams; or
a maximum allowed latency to infer the beam information associated with the second set of beams using the artificial intelligence algorithm.

8. The UE of claim 5, wherein the algorithm configuration information includes the output configuration information, and the output configuration information includes output parameters for output from the artificial intelligence algorithm comprising one or more of:
a first number of beams to be included in the second set of beams;
a second number of beams that are narrower than the first set of beams to be included in the second set of beams; or
a minimum accuracy of the beam information associated with the second set of beams.

9. The UE of claim 1, wherein the first set of beams includes one or more first synchronization signal block beams, and the second set of beams includes one or more second synchronization signal block beams or one or more beams that are narrower than the one or more first synchronization signal block beams.

10. The UE of claim 1, wherein the at least one processor is configured to cause the UE to transmit the beam information as part of a random access channel procedure.

11. The UE of claim 1, wherein the at least one processor is configured to cause the UE to transmit the beam information as part of a random access channel procedure via one or more of a Msg1 or a Msg3.

12. The UE of claim 1, wherein the beam information includes an index value for a table that provides association information for associating at least one beam of the second set of beams with the first set of beams.

13. A network equipment (NE) for wireless communication, comprising:
at least one memory; and
at least one processor coupled with the at least one memory and configured to cause the NE to:
generate one or more notifications that include an indication for a user equipment (UE) to apply artificial intelligence beam management, and algorithm configuration information including one or more of input configuration information or output configuration information for configuring operation of an artificial intelligence algorithm at the UE to generate beam information; and
transmit the one or more notifications to the UE for configuring the wireless communication between the NE and the UE.

14. The NE of claim 13, wherein to generate the one or more notifications, the at least one processor is configured to cause the NE to generate the one or more notifications as one or more of a master information block or a system information block.

15. The NE of claim 13, wherein the one or more notifications include an index value for a table at the UE that specifies one or more of the input configuration information or the output configuration information.

16. The NE of claim 13, wherein the input configuration information includes a first index value for a first table at the UE that specifies input parameters for input to the artificial intelligence algorithm, and the output configuration information includes a second index value for a second table at the UE that specifies output parameters for output from the artificial intelligence algorithm.

17. The NE of claim 13, wherein the one or more notifications include the input configuration information and the input configuration information specifies input parameters for input information to be input into the artificial intelligence algorithm, the input parameters comprising one or more of:
- a minimum number of beams to be described in the input into the artificial intelligence algorithm;
- a minimum value for one or more of reference signal received power, received signal strength indicator, reference signal received quality, or signal-to-noise and interference ratio for individual beams to be described in the input into the artificial intelligence algorithm;
- a minimum gap between the individual beams to be described in the input into the artificial intelligence algorithm;
- a maximum gap between the individual beams to be described in the input into the artificial intelligence algorithm;
- a fixed gap between the individual beams to be described in the input into the artificial intelligence algorithm; or
- a maximum allowed latency to infer the beam information using the artificial intelligence algorithm.

18. The NE of claim 13, wherein the one or more notifications include the output configuration information and the output configuration information specifies output parameters for output information from the artificial intelligence algorithm, the output parameters comprising one or more of:
- a number of beams to be identified in output from the artificial intelligence algorithm;
- a number of output beams that are narrower than one or more input beams that are to be identified in the output from the artificial intelligence algorithm; or
- a minimum accuracy of the beam information for one or more beams identified in the output from the artificial intelligence algorithm.

19. A method performed by a user equipment (UE), the method comprising:
- receiving a set of signals over a first set of beams;
- performing one or more beam measurements associated with the first set of beams based at least in part on the set of signals;
- generating beam information associated with a second set of beams based at least in part on the one or more beam measurements associated with the first set of beams, wherein the beam information includes a respective beam identifier for each beam of the second set of beams and one or more beam measurements associated with the second set of beams, and wherein the first set of beams is non-overlapping with the second set of beams; and
- transmitting the beam information associated with the second set of beams, wherein the beam information is for configuring wireless communication between the UE and a network equipment (NE).

20. A processor for wireless communication, comprising:
at least one controller coupled with at least one memory and configured to cause the processor to:
- receive a set of signals over a first set of beams;
- perform one or more beam measurements associated with the first set of beams based at least in part on the set of signals;
- generate beam information associated with a second set of beams based at least in part on the one or more beam measurements associated with the first set of beams, wherein the beam information includes a respective beam identifier for each beam of the second set of beams and one or more beam measurements associated with the second set of beams, and wherein the first set of beams is non-overlapping with the second set of beams; and
- transmit the beam information associated with the second set of beams, wherein the beam information is for configuring the wireless communication between the processor and a network equipment (NE).

* * * * *